May 4, 1926.
R. W. BAILEY
1,583,642
AUTOMOTIVE VEHICLE
Filed May 18, 1925
13 Sheets-Sheet 1
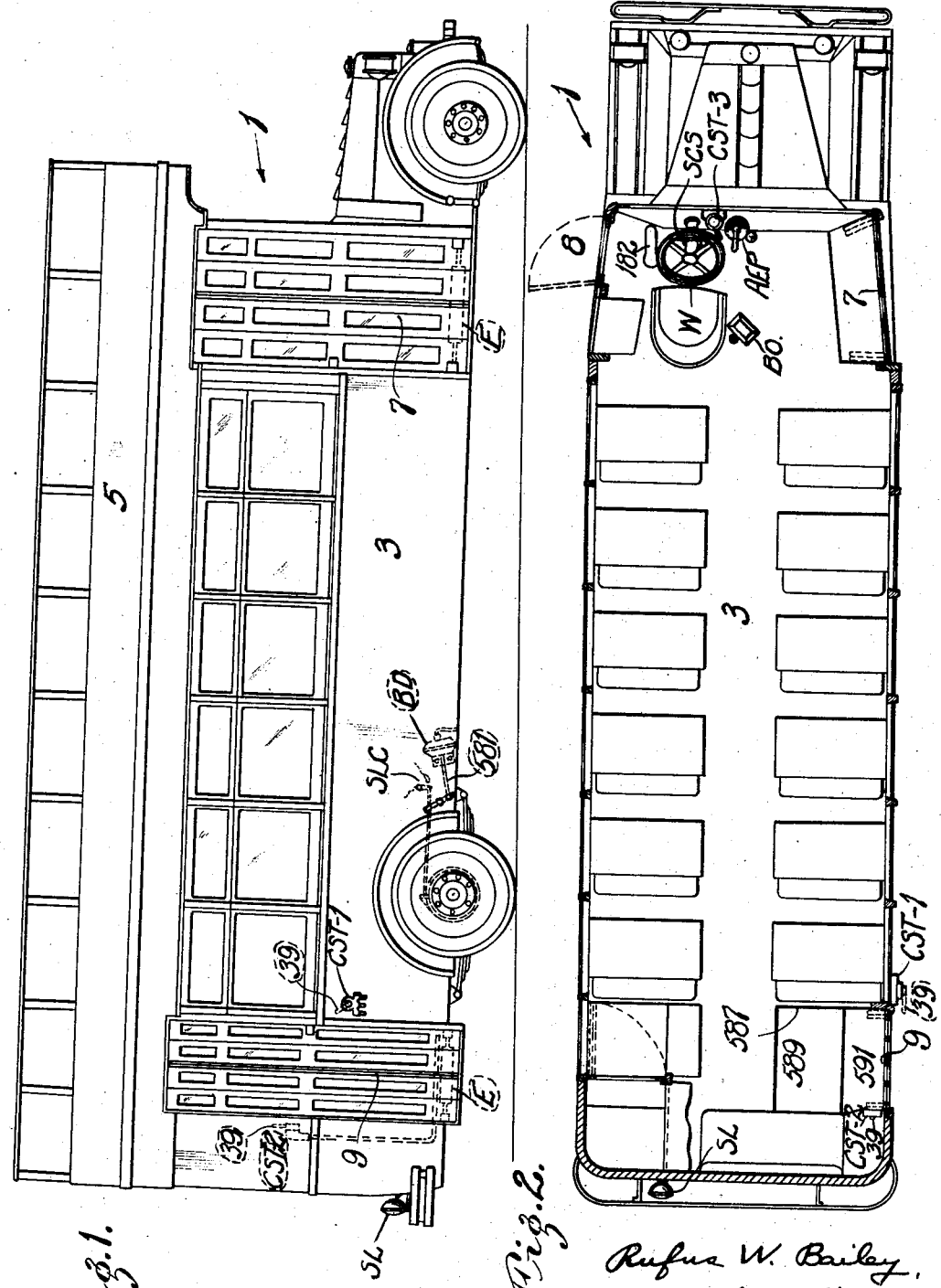

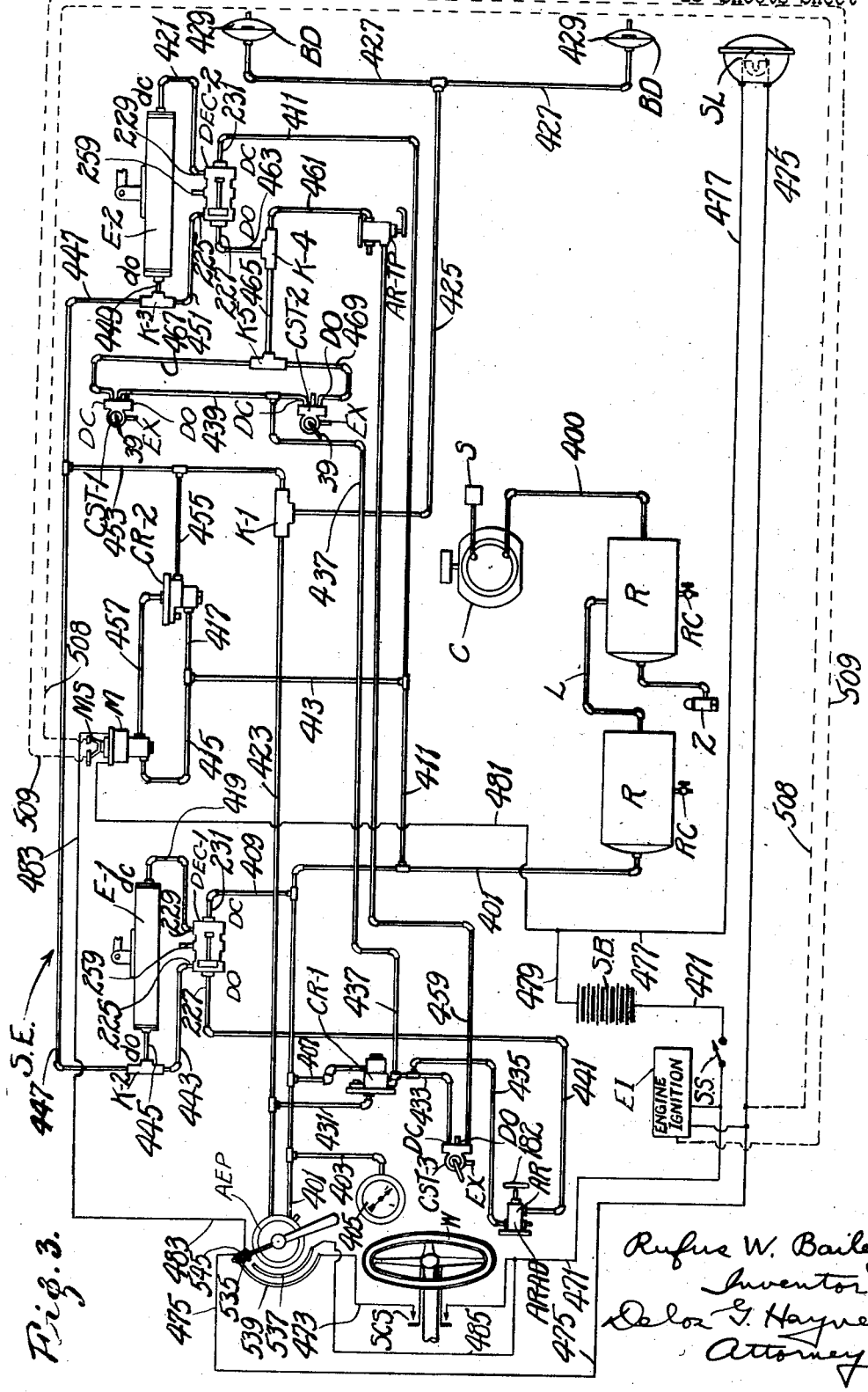

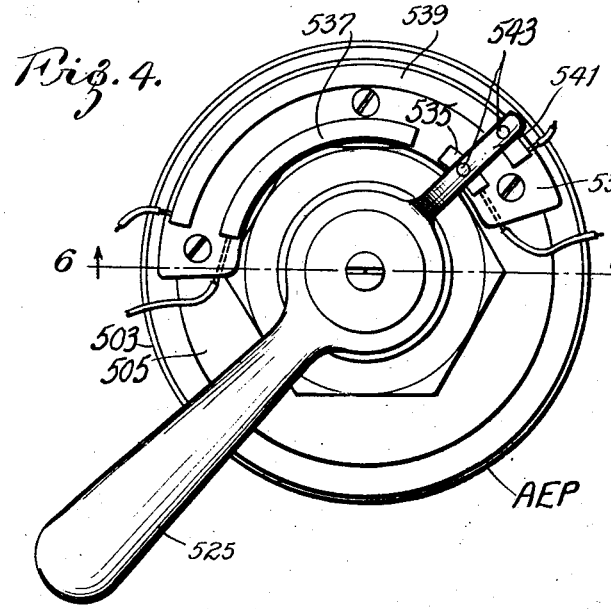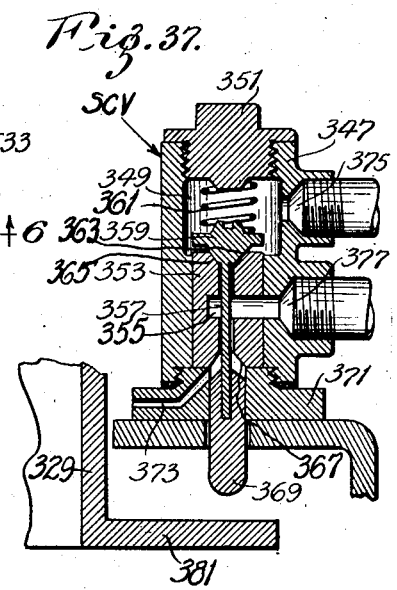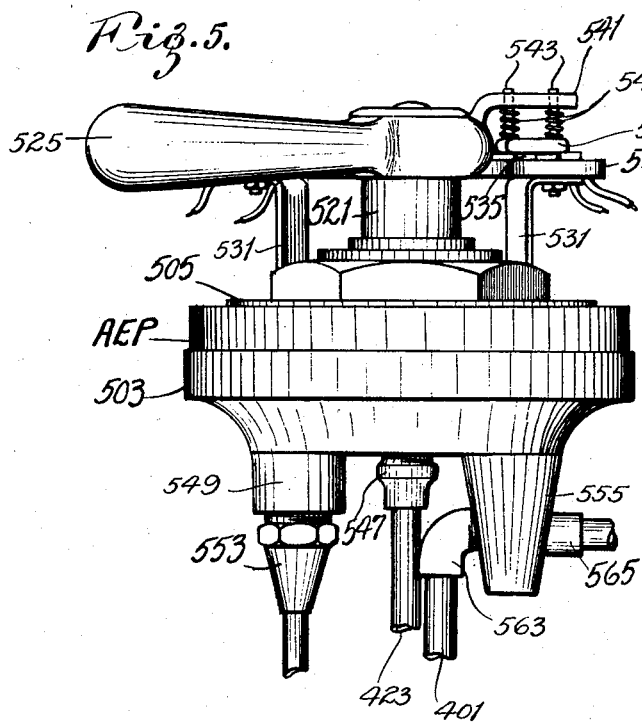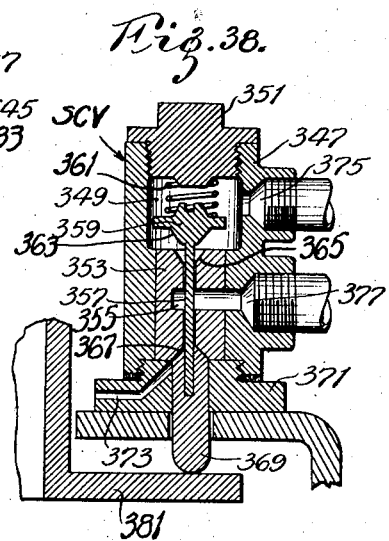

May 4, 1926.  1,583,642
R. W. BAILEY
AUTOMOTIVE VEHICLE
Filed May 18, 1925   13 Sheets-Sheet 4
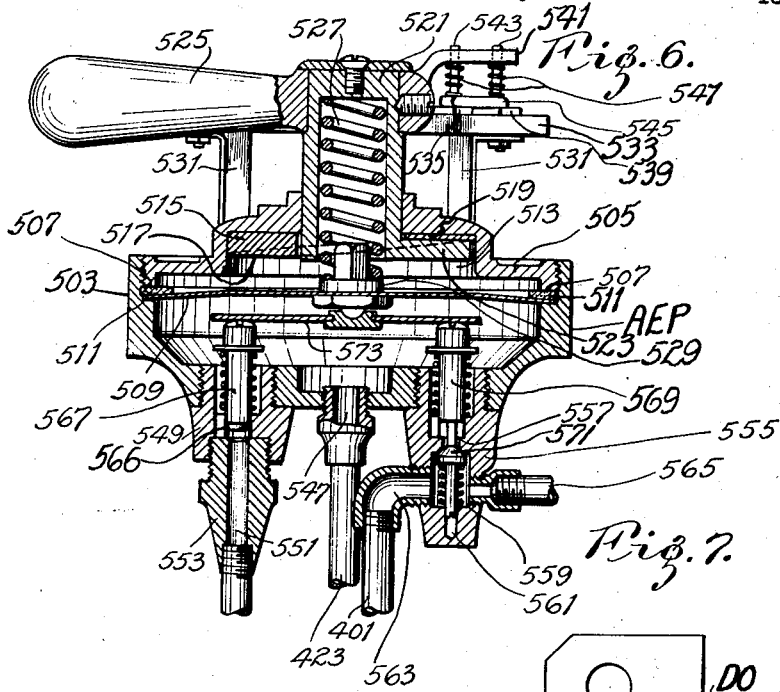
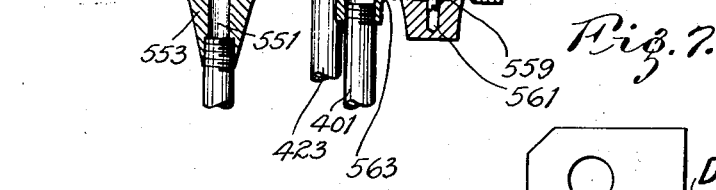
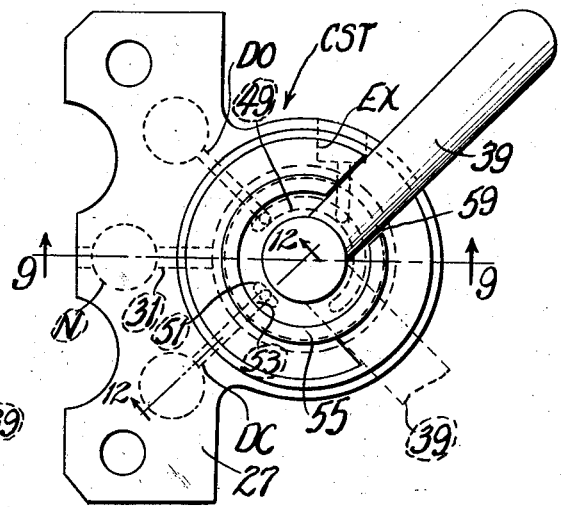
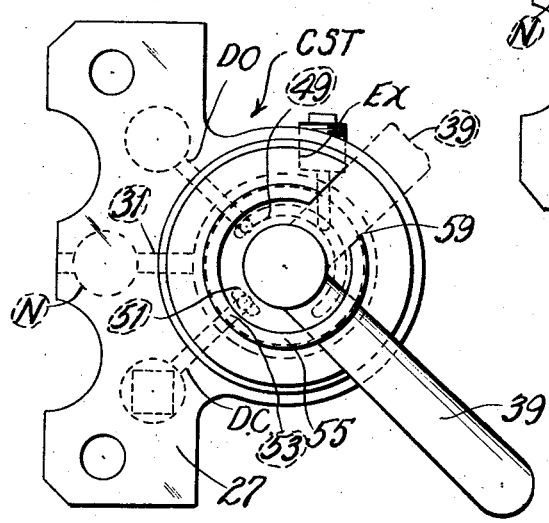

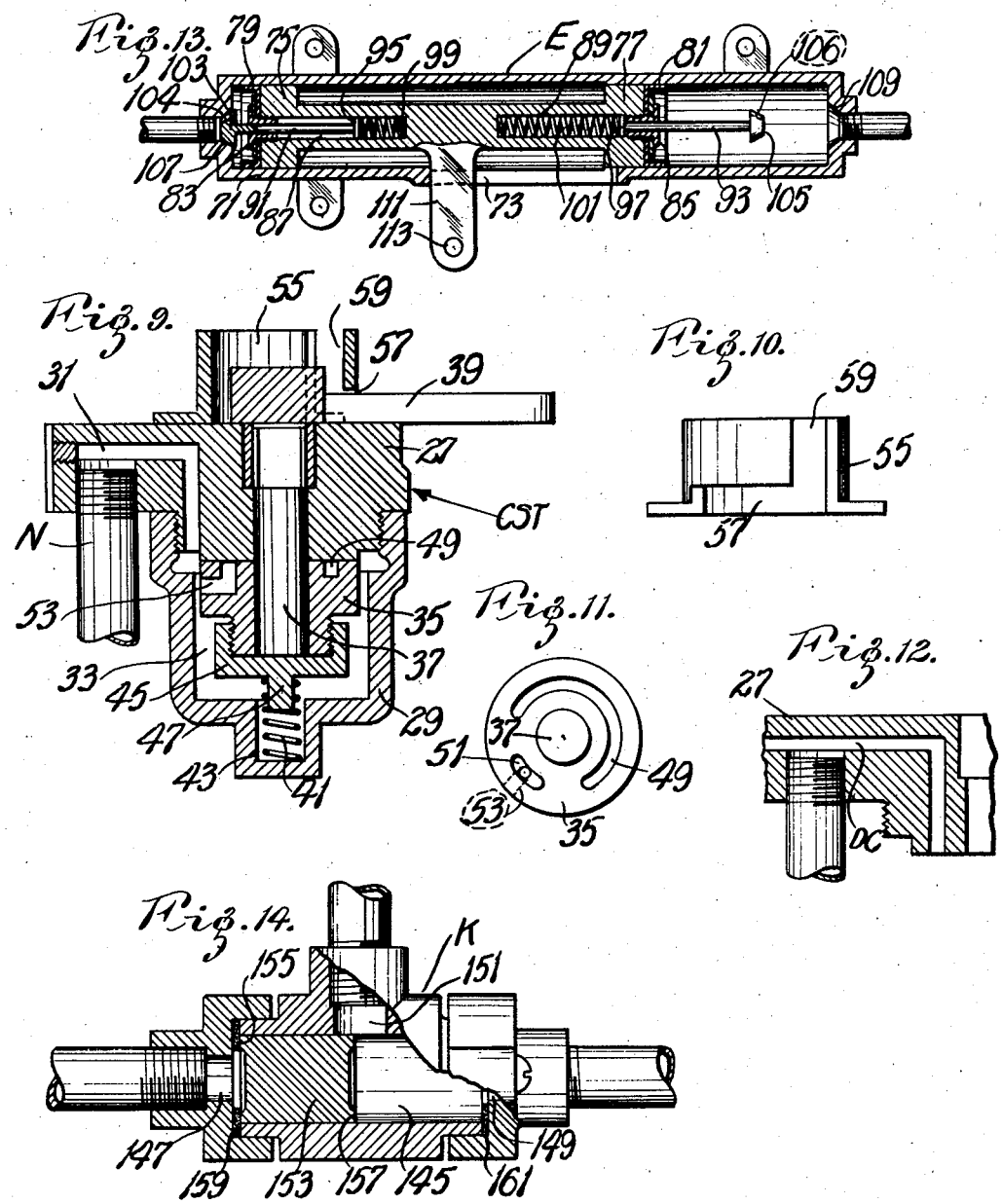

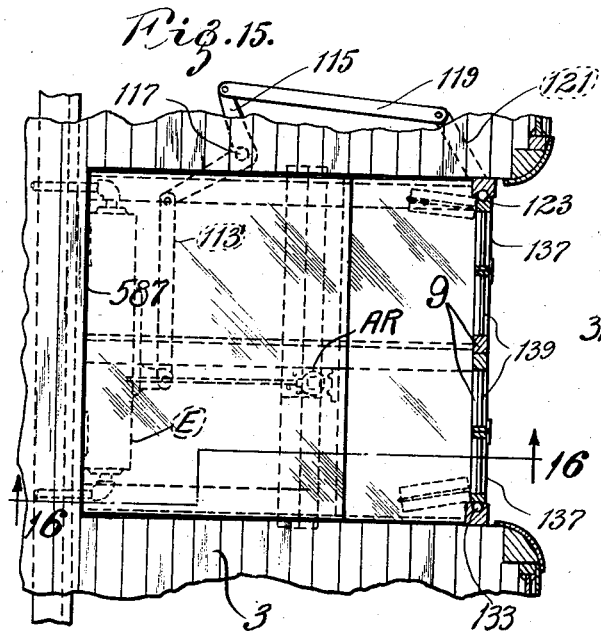
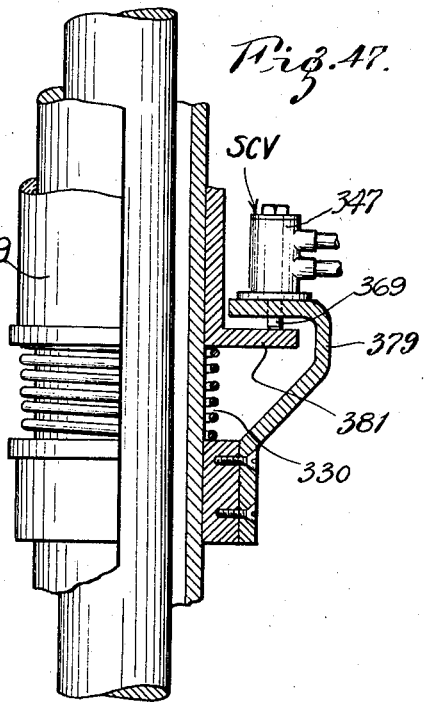
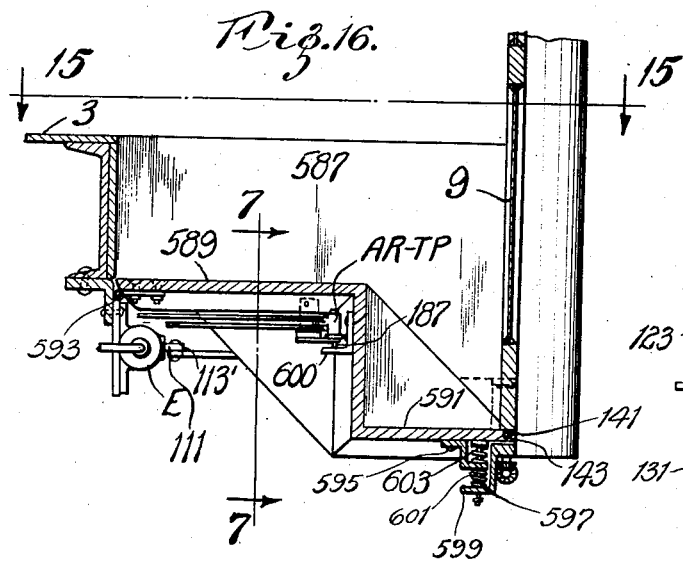
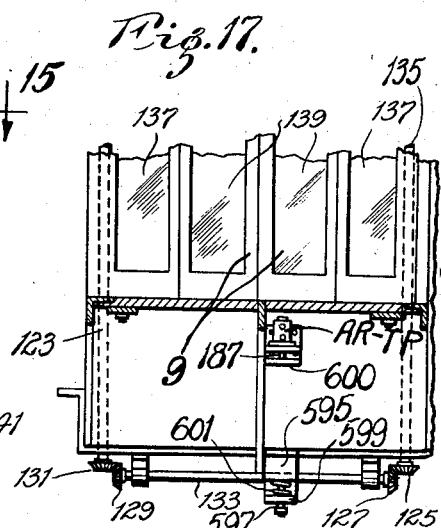

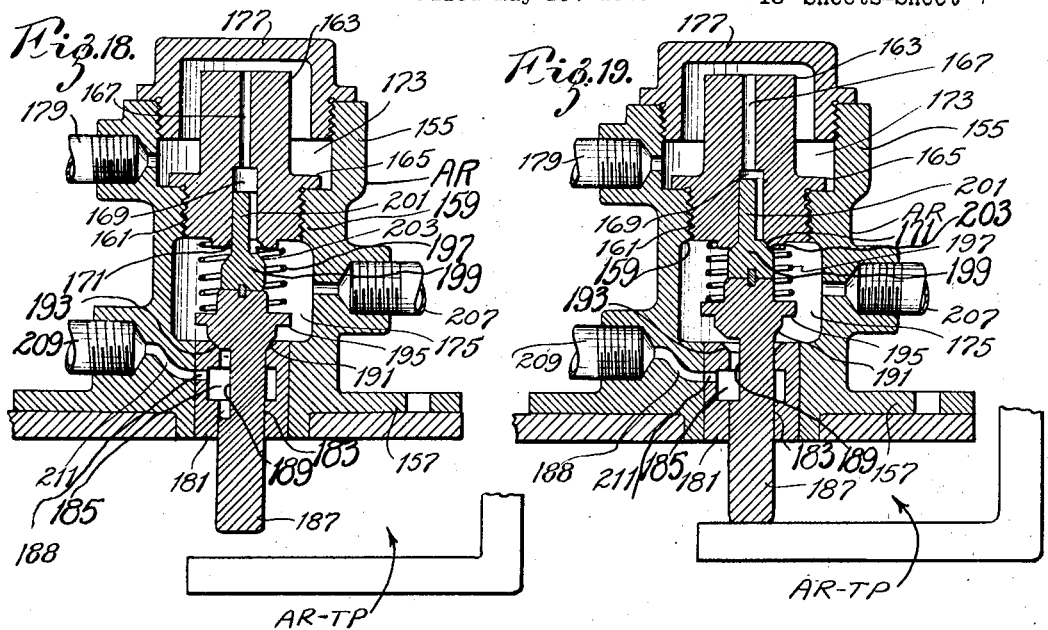
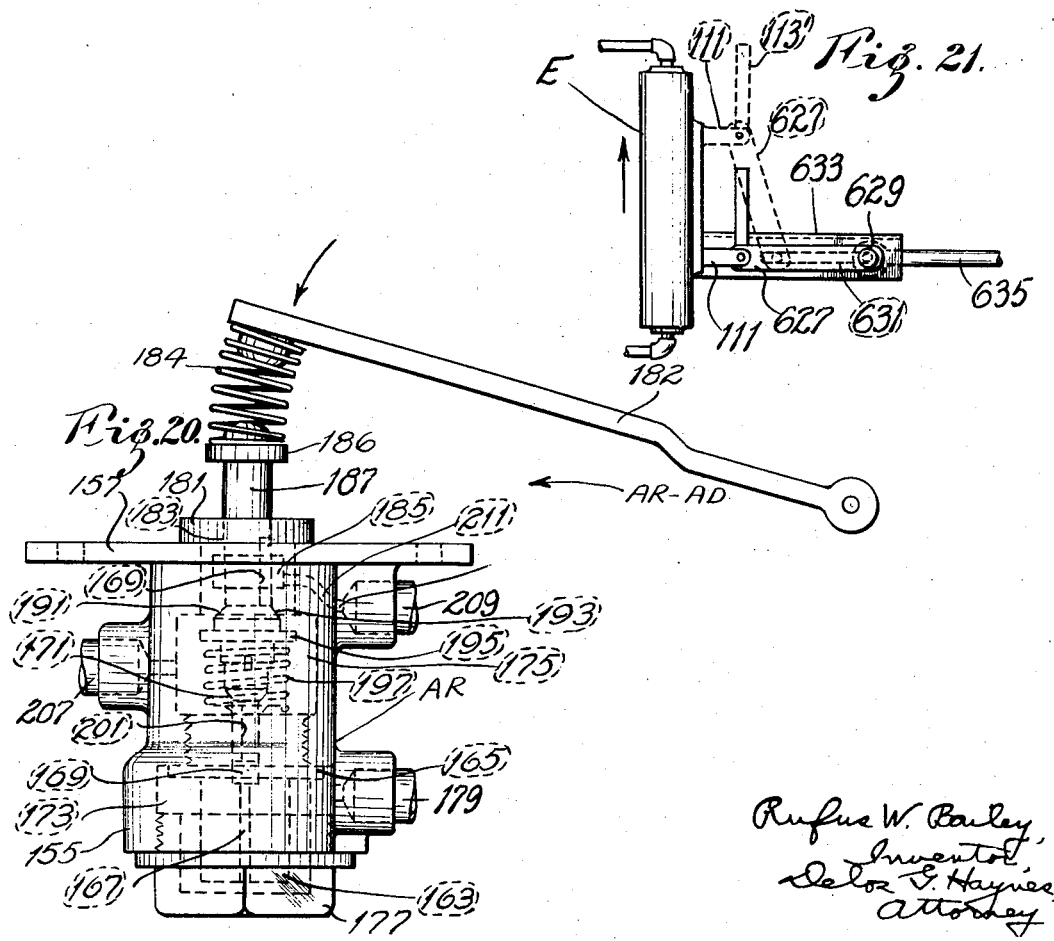

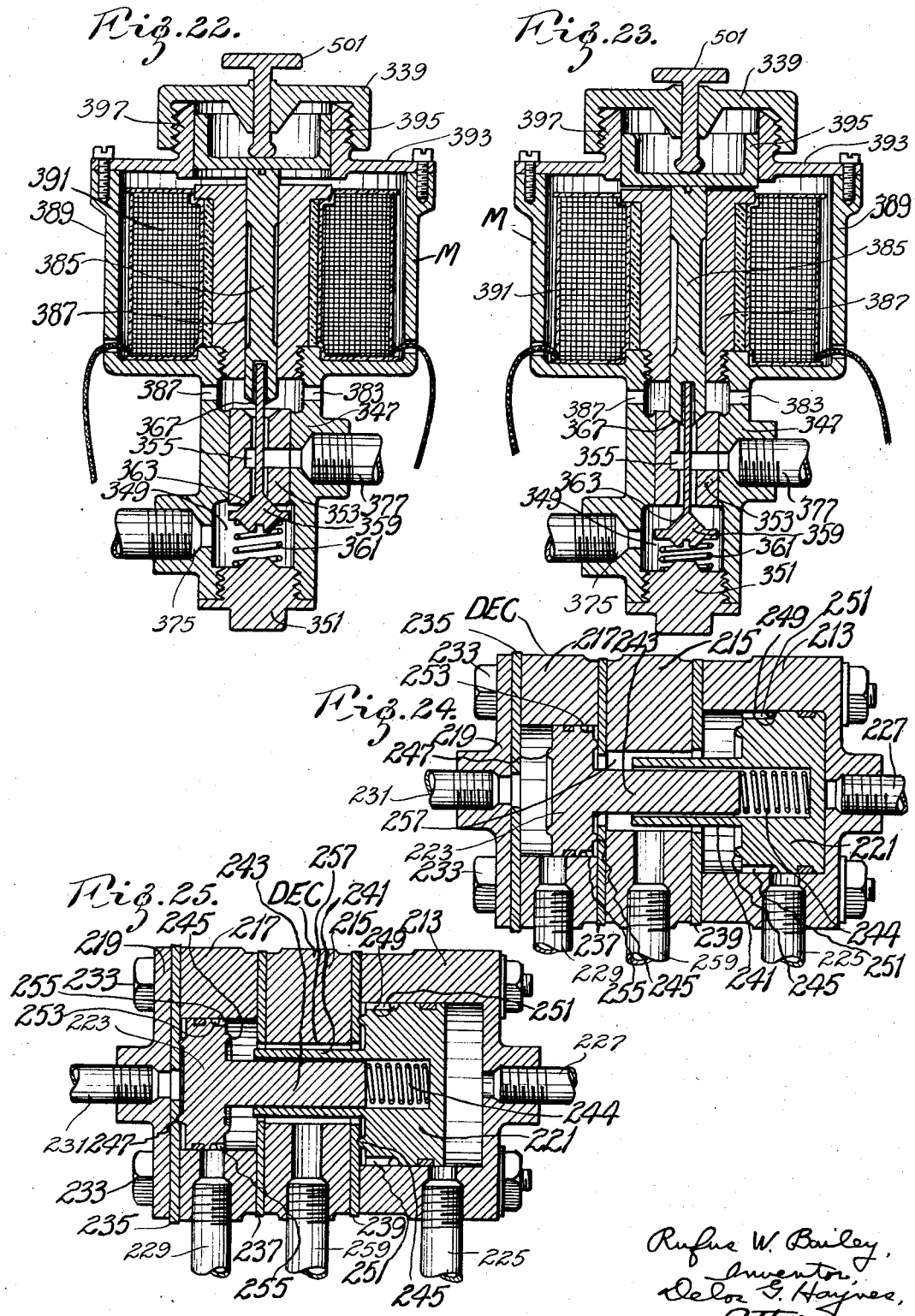

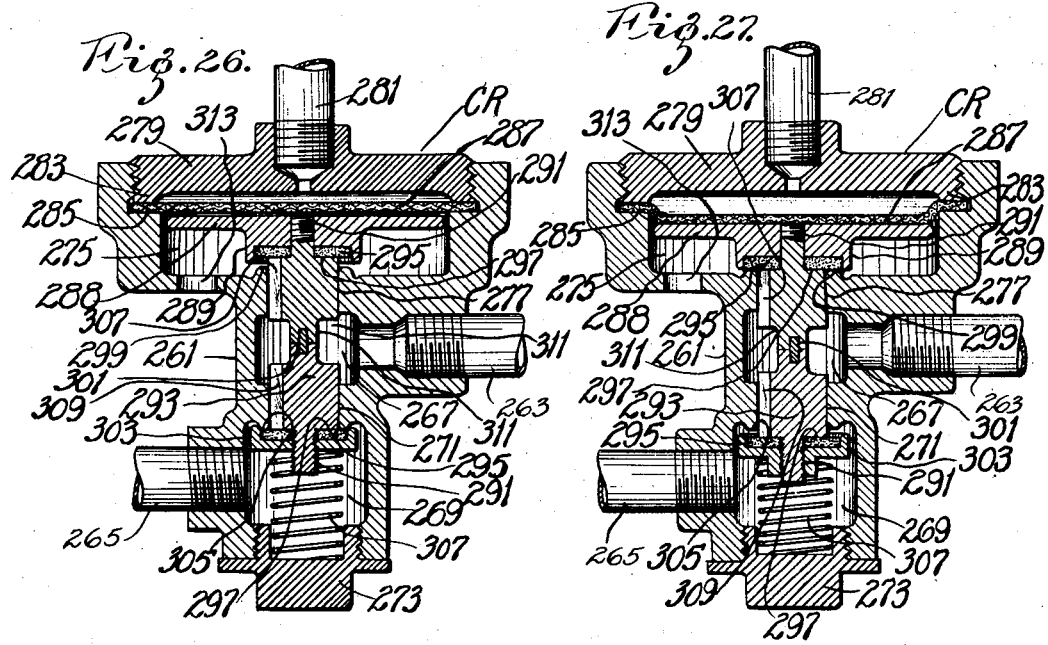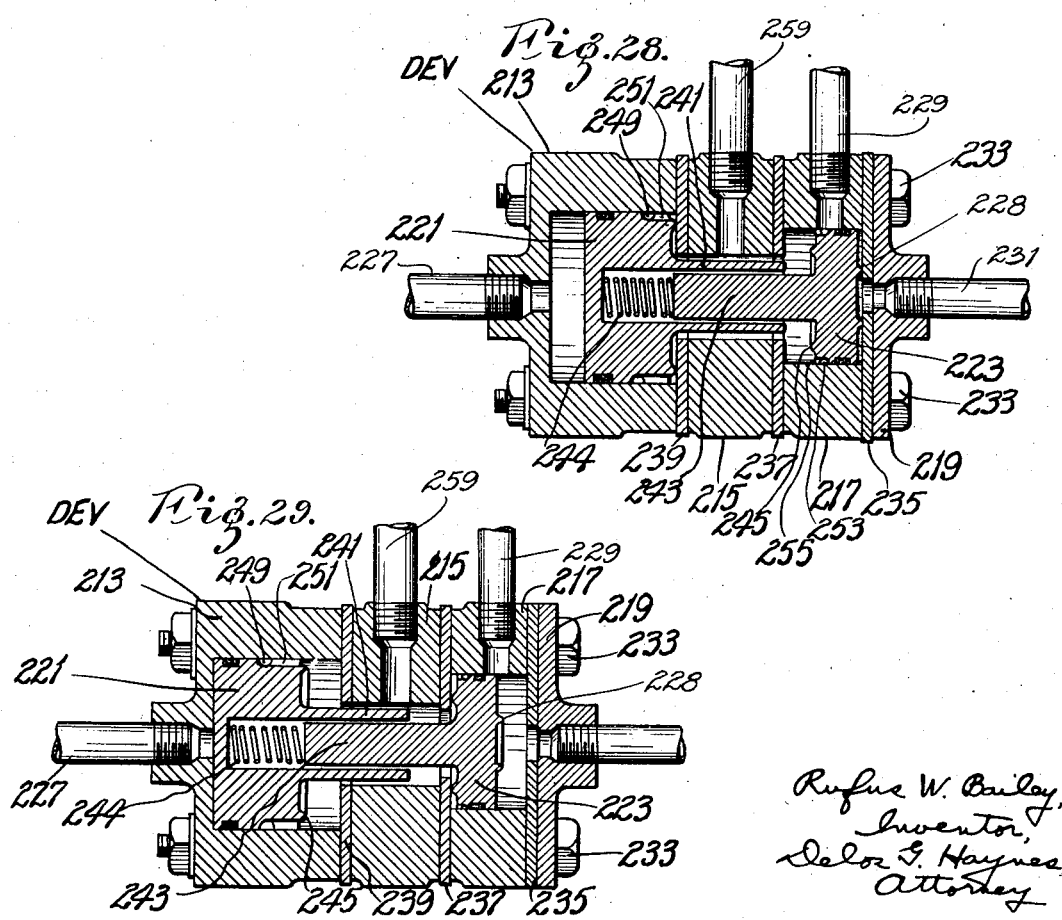

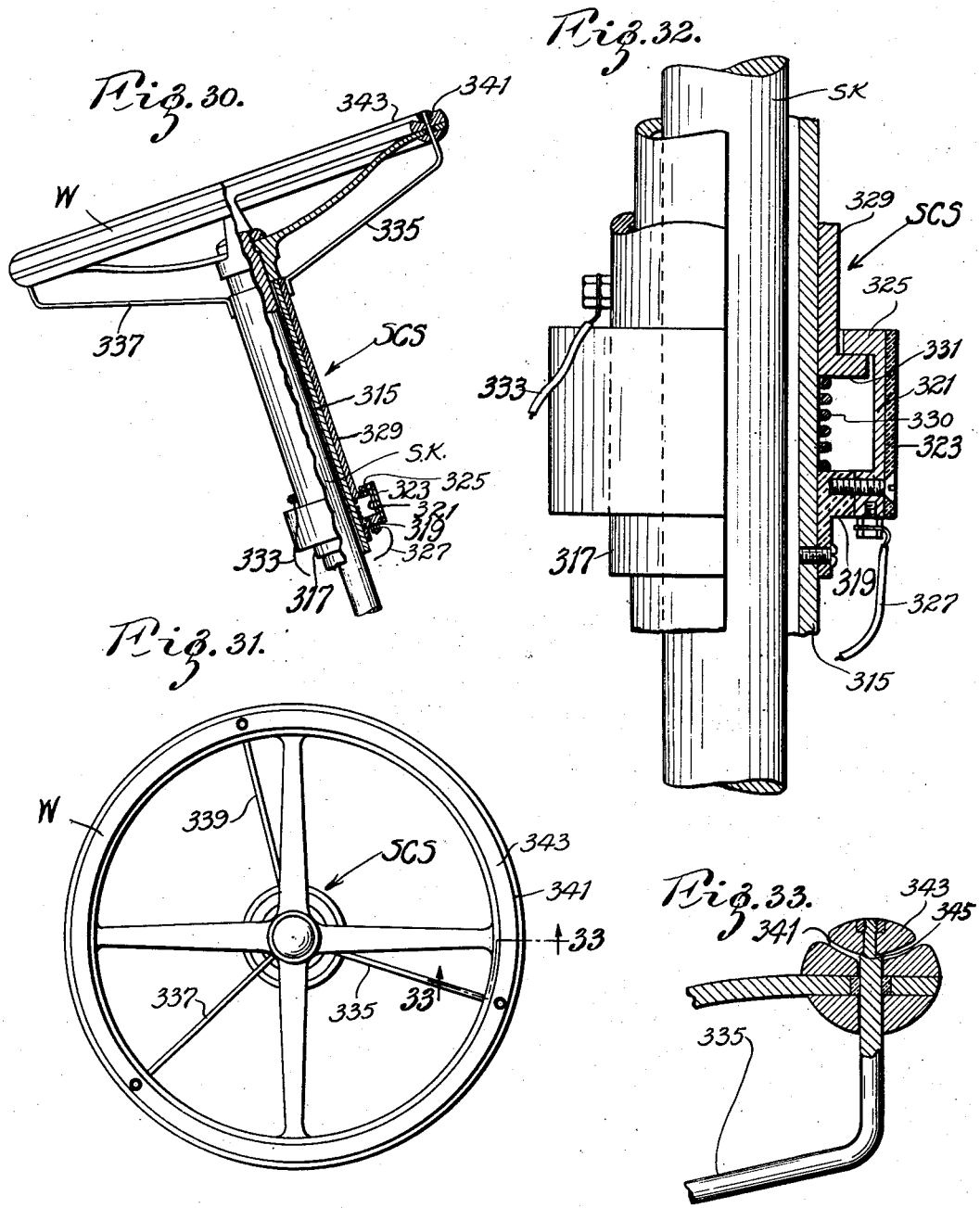

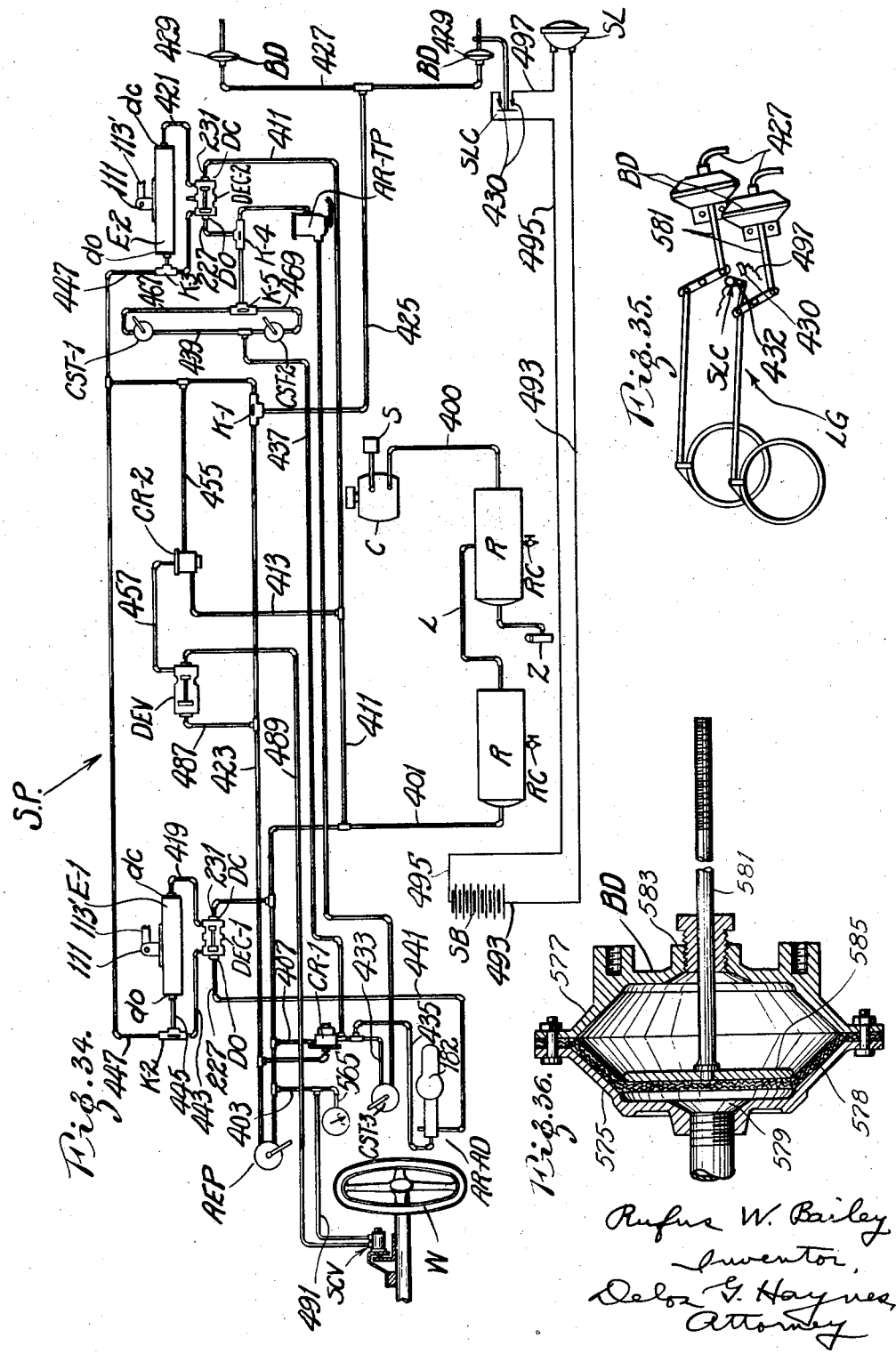

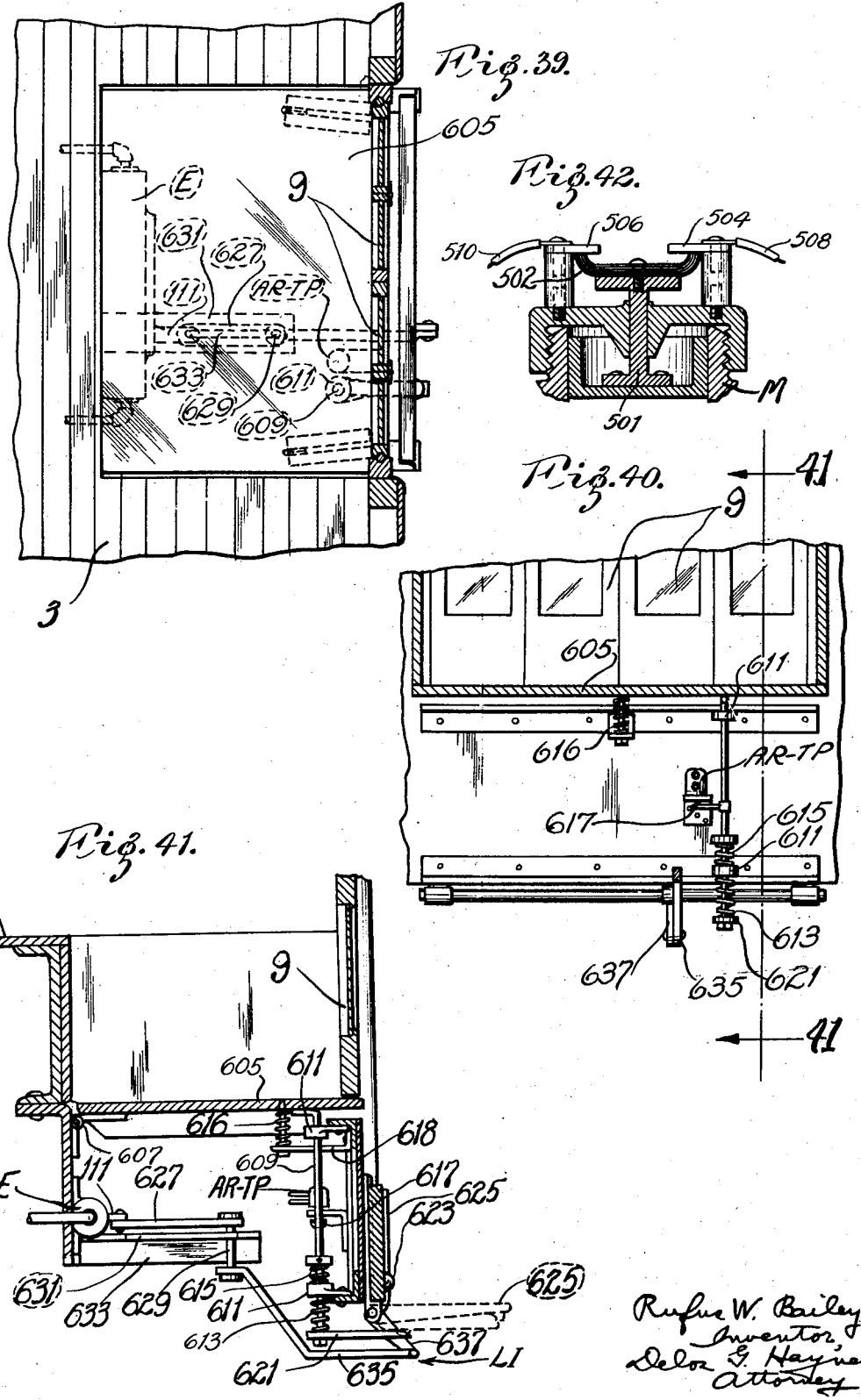

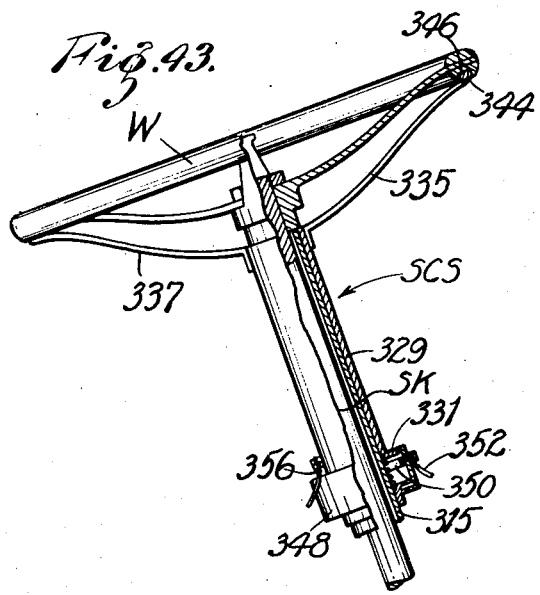
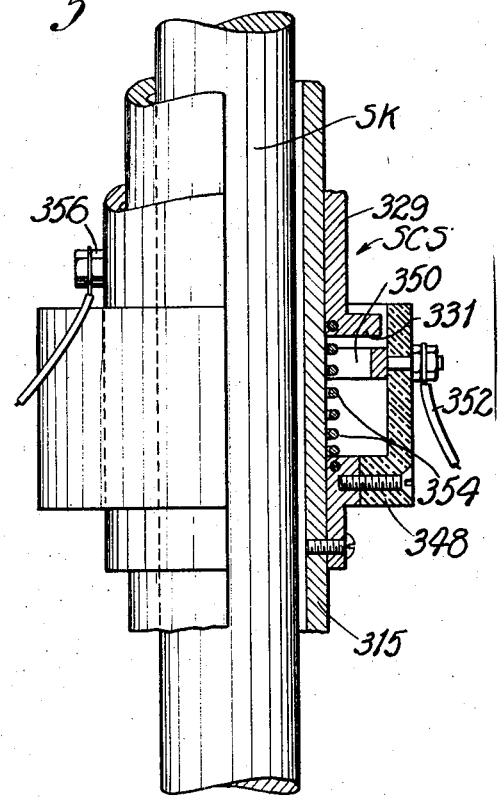
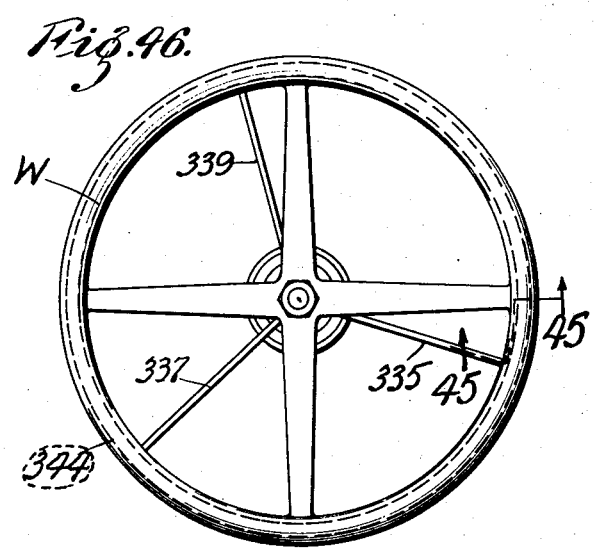
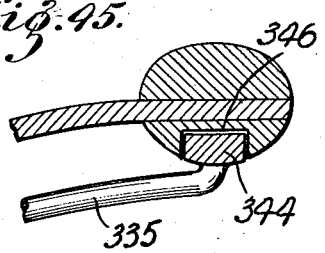

Patented May 4, 1926.

1,583,642

UNITED STATES PATENT OFFICE.

RUFUS W. BAILEY, OF KANSAS CITY, MISSOURI.

AUTOMOTIVE VEHICLE.

Application filed May 18, 1925. Serial No. 30,901.

*To all whom it may concern:*

Be it known that I, RUFUS W. BAILEY, a citizen of the United States, and a resident of Kansas City, Missouri, have invented an Improvement in Automotive Vehicles, of which the following is a specification.

This invention relates to automotive vehicles and with regard to certain more specific features, to motor coaches or busses.

Among the several objects of the invention may be noted the provision of a motor coach equipped with door controls, operable under the care of either one, two or three operators; one which is particularly safe in operation under all exigencies of heavy and fast traffic and which is safe under emergency conditions; and the provision of such a coach as described which shall be economical of the energizing agents which make possible the attainment of the above objects.

The invention accordingly comprises the features of construction, combination of elements, and arrangements of parts which are exemplified in the structure hereinafter described, and the scope of the application of which will be indicated in the following claims.

In the accompanying drawings, in which are shown two of various possible embodiments of the invention, Fig. 1 is a side elevation of a motor coach showing parts of the invention applied thereto;

Fig. 2 is a top plan view of the lower deck of the coach showing parts of the invention;

Fig. 3 is a piping diagram;

Fig. 4 is a plan view of a brake valve;

Fig. 5 is a front elevation of the brake valve of Fig. 4;

Fig. 6 is a vertical section of the brake valve shown in Figs. 4 and 5, taken on the line 6—6 of Fig. 4 and showing parts in full;

Fig. 7 is a plan view of a CST control valve showing all ports open;

Fig. 8 is a top plan view of the CST control valve shown in Fig. 7 but showing the exhaust and one port closed as used herein;

Fig. 9 is a vertical section taken on the line 9—9 of Fig. 7;

Fig. 10 is an elevation of a crown piece shown in Figs. 7, 8 and 9;

Fig. 11 is a plan view of the rotatable valve proper, of the control valve shown in Fig. 9;

Fig. 12 is a fragmentary section taken on the line 12—12 of Fig. 7;

Fig. 13 is a longitudinal section of a door engine;

Fig. 14 is a fragmentary sectional view of a two-way check valve;

Fig. 15 is a horizontal section taken on the line 15—15 of Fig. 16 showing the rear door treadle and associated parts;

Fig. 16 is a section taken on the line 16—16 of Fig. 15 and shows the treadle mechanism;

Fig. 17 is a rear elevation of the rear doors with parts broken away;

Fig. 18 is a vertical section of a release valve in open position;

Fig. 19 is a vertical section of the release valve of Fig. 18 shown in closed position;

Fig. 20 is an elevation of the release valve of Fig. 18 shown in closed position with an accelerator mechanism applied thereto;

Fig. 21 is a fragmentary view of a modified folding step mechanism;

Fig. 22 is a vertical section of a magnet valve shown in its de-energized and closed position;

Fig. 23 is a vertical section of the valve of Fig. 22 shown in its open and energized position;

Fig. 24 is a horizontal section of a door engine control valve shown in door closing position;

Fig. 25 is a vertical section of the valve of Fig. 24 shown in door opening position;

Fig. 26 is a vertical section of a relay valve shown in closed position;

Fig. 27 is a vertical section of the relay valve of Fig. 26, showing said valve in open position;

Fig. 28 is a vertical section of a differential emergency valve shown in non-emergency position;

Fig. 29 is a vertical section of said differential emergency valve shown in emergency position;

Fig. 30 is a side elevation, partly in section, of a steering wheel with a safety switch attached thereto;

Fig. 31 is an ideal plan view of the wheel of Fig. 30;

Fig. 32 is an enlarged elevation, partly in section, of the safety steering switch of Fig. 30;

Fig. 33 is an enlarged detail and fragmentary ideal section taken on the line 33—33 of Fig. 31;

Fig. 34 is a modified piping layout of the pneumatic system;

Fig. 35 is a perspective view of the brake operating diaphragms and stoplight switch;

Fig. 36 is a vertical section of a brake operating diaphragm;

Fig. 37 is a detailed sectional view of the safety control valve shown closed;

Fig. 38 is a view similar to Fig. 37 showing the safety control valve open;

Fig. 39 is a plan view of a modified rear door treadle;

Fig. 40 is a fragmentary rear elevation of Fig. 39;

Fig. 41 is a vertical section taken on the line 41—41 of Fig. 40;

Fig. 42 is an enlarged fragmentary section of a circuit breaker on the magnet valve;

Fig. 43 is a side elevation, partly in section, of a steering wheel with a modified form of safety switch attached thereto;

Fig. 44 is an enlarged partial section of the modified switch shown in Fig. 43;

Fig. 45 is an enlarged fragmentary ideal section taken on the line 45—45 of Fig. 46;

Fig. 46 is an ideal plan view of the wheel of Fig. 43; and

Fig. 47 is a fragmentary detail showing the application of a safety control valve to the steering post.

Similar reference characters indicate corresponding parts throughout the several views of the drawings.

Deck arrangement.

Referring now more particularly to Figs. 1 and 2, there is illustrated at 1 a motor coach comprising an enclosed lower deck 3 and an upper deck 5. The lower deck 3 is provided forwardly thereof with a set of doors 7 to be used as an entrance to the coach. These doors 7 are located on the right hand side of the coach looking forwardly thereof. On the left hand side of the coach opposite said doors 7 is provided a door 8. The door 8 is provided for the entrance and exit of the driver only, and in this invention, comprises no automatic features. Rearwardly on the right-hand side of said deck 3 is provided a set of doors 9 to be used as a passenger exit only, under normal conditions, but may be used as a passenger entrance, under such abnormal conditions as will be described hereinafter.

Opposite the rear doors, on the left side of the coach is located a stairway leading from the closed lower deck to the open upper deck. Passengers ascend to, and descend from the upper deck by means of these stairs.

Under normal operating conditions all passengers enter the lower deck at the front doors 7, and in choosing a seat on either deck, pass rearwardly on the lower deck. Upon leaving, they pass rearwardly to the rear doors thus obviating the necessity for any forward traffic in the aisle of the lower deck; that is, this is a one-way aisle.

The doors 7 and 9 and the braking system of the coach are under control of an interlocking compressed air system SP, illustrated in Fig. 34. A modified form SE of the system SP, is illustrated in Fig. 3.

Control features.

The system SP and its modified form SE, may, without adjustment be put under the control of either one, two or three men, i. e. the driver and conductor, or the driver, conductor and street fare collector. The position of leaving passengers influences operation also, as will be described hereinafter.

The pneumatic electric control system, in each of its modifications SP and SE, involves several valve and door-engine detail features which will be explained and described before the use and operation of the system as a whole is described.

Valves.

For the use of each the conductor and street fare collector a releasing air valve is used. Its primary nomenclature in this specification will be CST. This nomenclature will be subscripted for various applications of the valve.

Each valve and piece of apparatus which may have various applications in this invention will have a primary designation, and subscripted designations, the latter to be used for the various specific applications of the part in question.

Other valves and apparatus to be used herein are:

Door operating engines E, double check valves K, automatic release valves AR, door-engine control valves DEC, control valves CR, a differential emergency valve DEV, a safety control switch SCS, a safety control valve SCV, a magnet valve M, an automatic electric and pneumatic brake valve AEP, and brake diaphragms BD.

The descriptions of the various recited members will now be taken up.

Valve CST.

For the use of each the driver, conductor and street fare collector, a valve CST is used. This valve will be described in all parts as herein used and the particular modifications made thereon for specific applications will later be explained (see Figs. 7 to 12).

The valve CST as illustrated in Figs. 7, 8 and 9 comprises a body 27 with a lower chambered cup 29 screwed upwardly thereto. Pipe N brings air to the body portion 27 and cup 29. The bore 31 leads from the pipe N to a chamber 33 in cup 29. The chamber 33 contains a valve 35. This valve 35 has fitted thereto the stem 37 whose flattened upper terminal receives a removable control lever 39. The valve 35 is kept seated against the body 27 by the coiled spring 41 which reacts at its lower end in a pocket 43 of the cup 29 and at its upper end against a cap 45 screwed to the valve 35. The cap 45 has cast centrally therewith a lug 47 for aligning the spring 41.

The valve 35 has an arcuate groove 49 cut in its upper face which serves alternately to join ports DC and DO of the body 27 with an exhaust port EX. Likewise a groove 51 communicating with the passage 53 serves to connect the pipe N through bore 31 alternately with said ports DC and DO. The handle 39 can be applied to the valve stem 37 only when the groove 49 connects the ports DO with the port EX and consequently when the pipe N is in communication with the port DC. This is true because of the crown-piece 55 fastened to the top of the body 27, which, due to the lateral slot 57 permits oscillations of the lever 39, but because of the vertical slot 59, equal in width to the width of lever 39, will not permit taking off the handle 39 except at one position such as described.

The operation of the CST valve is as follows:

When the handle 39 is in the solid-line position shown in Figs. 7, 8 and 9 it may be applied to or taken from the valve stem 37 as permitted by the slot 59 of the crown piece 55. This corresponds to such a position of the valve ports as will put the supply pipe N in communication with port DC which corresponds to a door-closed position of one of the door engines. The door engine in question receives its door opening air supply through this valve.

If the handle 39 be set over to the dotted-line position of Fig. 7 it may not be removed. This is its door-open position. Then supply pipe N feeds the port DO which leads to the door-opening side of the door engine. The engine then operates to open the doors. The handle 39 can only be removed when the doors are shut thus obviating accidents due to operators leaving coach doors open when changing posts. Each operator carries a handle 39 so that unauthorized persons can not tamper with these valves.

For use as a conductor's valve CST² and as a street fare collector's valve CST¹ the described valve CST has its door closing port DC plugged shut.

For uses as an operator's rear control valve CST³ this valve has both the said port DC and its exhaust port plugged shut. See Fig. 8).

The valve CST is thus adapted for use in various locations and is flexible in its application.

*Door engines E.*

The door-operating engines E (Fig. 13) each comprise a cylinder 71 slotted at 73. Within the cylinder is a double headed piston operable to right and left. The heads 75 and 77 of this piston are provided with leather packing rings 79 and 81 held in place by washers and bored plugs 83 and 85. The plugs 83 and 85 are screwed into holes 87 and 89 bored longitudinally of the piston. The bored plugs serve as bearings for rods 91 and 93 put therethrough. The rods 91 and 93 are flared on their ends within the holes 87 and 89, and said flares 95 and 97 are backed by springs 99 and 101 set in the holes 87 and 89. These springs tend to hold the rods 91 and 93 outwardly from the holes. The rods 91 and 93 are provided with valves 103 and 105 at the rod ends opsite the flares. These valves are slotted at 104 and 106 respectively. The valves 103 and 105 are adapted to seat themselves in seats 107 and 109 at the ends of the cylinder 71. Centrally of the piston is provided an arm 111 extending laterally from said piston out through the slot 73 and adapted by means of a pin-hole 113 to operate the door operating linkage shown in Figs. 15, 16 and 21.

The operation of the door engine proper is started from the, say door-closed position, shown in Fig. 13. Air is admitted through a pipe from the left (Fig. 13). The valve 103 is forced from its seat and the piston with arm 111 is pushed toward the right as pressure builds up in the left end of the cylinder. In the meanwhile the charge of air which has been present in the right-hand end of the cylinder 71 is being forced out of the pipe at the right end of the cylinder to an exhaust. This goes on at a rapid rate until the valve 105 seats itself. The valve 105 seats itself just before the doors open completely and, by partially trapping air in the right end of the cylinder, materially decelerates the opening of the doors. However, the doors continue to open, in so far as air is permitted to escape slowly from the right-hand end of cylinder 71 by means of the slot 106 in the valve 105. After or before the doors have been opened, the cycle of action within the cylinder 71 may be reversed by admitting air at the right and exhausting at the left. The transposition of the right-hand and left-hand pipes from exhaust to inlet pipes and vice versa is accomplished by means of other apparatus, the coordination of which will be described later.

Double check valves K.

The check valves K (Fig. 14) each comprise a cylinder 145 with a pipe connection at either end and one centrally thereof. Passages 147, 149 and 151 lead from these pipe connections to said cylinder. The latter passage 151 leads to the center of the cylinder 145 as shown. A free piston 153 is provided within the cylinder 145. The piston 153 is provided with lips 155 and 157 which seat on gaskets 159 and 161 respectively. The piston 153 is of such length that the central port 151 is open whenever the piston 153 is seated at either end of the cylinder. Thus, air entering the cylinder through either of the passages 147 or 149 forces the piston 153 to the opposite end of the cylinder where one of its lips cooperates with a gasket thus sealing that end of the cylinder 145, while the incoming air passes out through the open central port.

Automatic release valve AR.

The automatic release valve AR forms a component part of valve mechanism AR—TP and AR—AD, the application of which mechanisms will be described later. The valve AR (Figs. 18, 19 and 20) comprises a body portion 155 flanged at 157 for fastening the body to other parts of the vehicle. The body portion 155 is inwardly flanged at 159 and said flange is inwardly and vertically threaded at 161. The inward threads 161 are adapted to receive a differentially bored plug 163. The plug 163 is provided with a shoulder 165 for seating purposes on the inward flange 159. The plug 163 is provided with the said vertical differential bore 167 which has an enlarged lower portion 169. The lower enlarged portion of bore 169 is provided with a downwardly facing beveled seat 171. The plug 163 is adapted to divide the body 155 into two inward compartments. One of these compartments 173 is above the other compartment 175. The upper compartment 173 is closed by means of a threaded cap 177. The said compartment 177 is provided with a threaded inlet port 179. Below the compartment 175 and in the body 155 is forced a bored bushing 181. The bore 183 of this bushing 181 has a counter bore at 185 therein, and a lateral bore 188 meeting said counter bore. The bushing 181 has slidably fitted into its bore 183 a stem 187. The stem 187 has a flat milled portion 189 cut therein. It is also provided with a downwardly beveled shoulder 191 adapted to cooperate with a beveled upper portion 193 of said bore 183. When the beveled portion 191 of the stem 187 is seated on the beveled portion of the bushing 181 the milled portion is adapted not to come to the lower edge of the bushing. Above the beveled shoulder 191 is provided another flat shoulder 195 adapted to take the reaction of a spring 197 placed thereon. This spring 197 beside reacting on the said shoulder 195 reacts at its upper end against the plug 163. Doweled to the upper surface of the stem 187 within the confines of the spring 197 is a teat 199. The teat 199 is provided with a reduced portion 201 which extends slidably into the said enlarged lower hole 169 of the plug 163. The reduced portion 201 is milled flat on one side. At the base of the reduced portion of the teat 199 is provided another beveled shoulder 203 adapted to cooperate with the said lower beveled seat 171 of the plug 163.

It will be seen that this construction results in a second lower chamber 175 within the body 155. This chamber 175 is provided with a threaded outlet 207. Oppositely formed on the body 155 is a threaded exhaust port 209. The port 209 has a cored connection 211 with the said laterally located bore 188.

The vertical distance between the upper beveled shoulder 203 and the lower beveled shoulder 191 is less than the distance between the beveled seat 171 of the plug 163 and the beveled seat 193 of the bushing 181. Hence in the position shown, the spring 197 is adapted to seat the shoulder 191 on the seat 193 thereby keeping the exhaust port 209 out of communication with the chamber 205. If the stem 187 is pushed upwardly against the reaction of the spring 197 until the beveled shoulder 203 strikes the beveled seat 171, said exhaust port 209 is put into communication with the lower chamber 175 and thereby with the outlet port 207. This last operation puts the inlet port 179 out of communication with the said chamber 175 and outlet port 207 where said inlet port had been in communication with the chamber and outlet port.

The operation of the valve AR is as follows:

If it is desired to pass air from the inlet port 179 to the outlet port 207 the stem 187 is left free. This permits the spring 197 to close the downward valve seats thus keeping the exhaust port 209 out of communication with the inner chamber 175 of the valve. Air then passes into the port 179, chamber 173 through the passages 167, 169 into the lower chamber 175 and to the outlet 207. The milled portion of the extension 201 permits passage of air through the bore 169 since said portion is formed to the shoulder 203. To shut the valve it is only necessary to press the stem 187 into the body 155 until the upper valve seat is closed. This opens the lower seat. All passage of air from the inlet port 179 to the outlet port 207 is thus stopped. However the opening of the lower seat permits any air in chambers connected with the outlet 207 to pass back from said outlet into the chamber 175 through the lower valve seat, through the bore 183, counter bore 185, lateral bore 188, cored passage 211 and out to the exhaust 209. The milled portion 189 is formed up to the said beveled shoulder 191 and therefore air may pass as described.

*Door engine control valves DEC.*

These valves (Figs. 24 and 25) comprise four annular body portions 213, 215, 217 and 219. The end body portion 213 forms a cylinder into which is fitted a relatively large diametered piston 221. The body portion 217 forms a cylinder into which is fitted the relatively small piston 223. The more or less centrally located body portion 215 forms a cylinder of relatively smaller bore than either of the said cylinders or body portions 213 and 217. Laterally formed in the body portion 213 is an outlet port 225. Longitudinally and centrally of said body portion 213 is formed the inlet port 227. A corresponding outlet port 229 and a corresponding inlet port 231 are formed in the body portion 217 and the body portion 219 respectively. The four body portions 213, 215, 217 and 219 are bolted together by means of studs 233. The body portions have interposed between them gaskets 235, 237 and 239. These gaskets are formed of leather or other suitable material. Previous to the assembly of the body portions above described, the said pistons have been fitted therein. Rings (shown conventionally) in the pistons make a slidable air tight joint between the pistons and the body pieces. It will be noted that the large piston 221 is provided with a relatively long bored shank 241. This bored shank slidably receives the relatively long solid shank or piston rod 243 of the piston 223. A spring 244 is positioned within the bored shank 241 and abuts the piston rod 243.

Each piston is provided upon its inward face with an annular lip 245 and the small piston 223 is provided with an annular lip 247 on its outer face. These lips are adapted to cooperate with said gaskets to form a tight sealed joint. The large piston is provided with an annular groove 249 adapted to come within the range of the outlet port 225 when the piston 221 is at the head of its cylinder 213. This annular groove 249 is connected with the inside chamber of the cylinder 213 by means of grooves 251. The piston 223, when the piston 221 is in the position shown in Fig. 24, is adapted to have its outer edge cross the outlet port 229. The piston 223 is also provided with a groove 253 similar to the groove 249 of piston 221, and grooves 255 are connected therewith, similar to the grooves 251 of piston 221. These grooves 255, when the piston 223 is in its left hand position shown in Fig. 25, are adapted to put the outlet port 229 in communication with the inside of the body 217. When the piston 223 is in the position noted the outer edge of the large piston 221 cuts across its outlet port 225.

The inner cylindrical portion 257 of the body portion 215 is in communication with the inner cylindrical cavities of the body portions 213 and 217. The gaskets are adapted to permit this. The inner cylindrical portion 257 is also provided with an exhaust port 259. The function of the valve is as follows:

Relatively high pressured air coming into the inlet port 231 puts the pistons in the positions shown in Fig. 24 and passes to the outlet port 229 for use as required, namely to operate the door closing side of the door engines E (Fig. 3). The valves in Fig. 3 are inverted from the Fig. 24 and 25 positions. This puts the former outlet 225 of the body portion 213 into communication with the exhaust port 259. The outlet 225 receives air from the door opening side *do* of a door engine. Hence this air is exhausted.

Since the large piston 221 has a greater area than the small piston 223, air pressure entering the inlet port 227 equal in pressure to that entering inlet port 231 would cause the pistons to be thrown over to the positions shown in Fig. 25. Hence any air that had theretofore passed from the inlet port 231 to the outlet port 229 would now escape to the exhaust port 259 as hereinbefore indicated. This would mean, in the present application of the valve, that air would escape from the door closing side *dc* of a door engine.

The spring 244 serves as a lost-motion engagement between the pistons so that two lips such as 245 and 247 may seat simultaneously on their respective gaskets even though said gaskets have unequal original thickness or shrink unevenly while in use. The operation is such that the small piston may be seated first and then the larger area of the large piston causes said large piston to be pushed forward, compressing the spring to such an extent that its lip imbeds itself in the gasket 239.

Meanwhile the air entering the inlet port 227 would pass to the outlet port 225, and in the present application, would pass to the door opening side *do* of the said door engine.

Upon releasing or substantially decreasing the pressure on the large piston, the pressure on the small piston again causes the first described conditions and residue air from the door opening side *do* of the said engine passes to the exhaust port 259.

The valve is adapted to permit a given reservoir pressure to normally pass to the door closing end *dc* of a door engine and to hold said engine in door closed position. This it does by passing through the small piston side of valve DEC. However, should this same pressured air be led by other paths to be described, to the large piston side of the valve DEC, the valve will act to permit that air to pass to the door opening side *do* of the door engine and cause the air in the said door closing side *dc* of said engine to exhaust.

The valve acts as a selective shunt for a given pressured air, its selectivity being with reference to the point from which said air comes.

*Control valve CR.*

This valve (see Figs. 26 and 27) is adapted to permit passage of high pressure air therethrough when certain lines reach another predetermined lower air pressure.

Referring now to Figs. 26 and 27, the valve CR comprises a body 261 provided with threaded ports 263 and 265. These ports 263 and 265 communicate with chambers 267 and 269 within the valve body 261. The chamber 269 is below said chamber 267 and connects therewith by a longitudinal bore 271. This chamber 269 is closed and made air tight by a threaded cap 273.

The said chambers are substantially circular. Above the chamber 267 is located another relatively large circular chamber 275 connected with said central chamber 267 by means of a concentric bore 277. The bores 277 and 271 are coaxial.

The upper chamber is closed by a flat threaded cap 279. The cap 279 is provided with a threaded inlet port 281. Said cap retains between a flange 283 thereof and an inner shoulder 285 of said body 261, a flat, tough and pliable disc 287.

Located below this disc and in proximity thereto is a metallic plate 288. This plate is adapted to act as a backing plate to the disc when air pressure is led into the port 281. Said plate is provided with a downwardly extending cylindrical portion 289 centrally bored to receive a threaded shank 291 of a two-piece guide bar 293. The cylinder 289 is counterbored at the bottom thereof to receive a flat gasket 295 made of leather or other pliable material through which said shank 291 extends. A shoulder 297 on the guide bar 293 holds the gasket 295 in place. A circular lip 299 formed on the body 261 is adapted to cooperate with said gasket 295.

The guide bar 293 comprises two similar pieces of cylindrical metal joined at the point 301 by ordinary means such as brazing, soldering or doweling as shown.

The pieces are alike but the lower one is inverted and has its threaded shank 291 screwed into a counterbored abutment 303. The shoulder 297 of the piece holds another gasket 295 in place within said counterbore; and a lower lip 305 of the body 261 cooperates with said gasket 295.

A coil spring 307 reacts under normal conditions, between the lower cap 273 and the abutment piece 303 to hold the lower gasket 295 to a seat on the lip 305, thus putting the lower chamber 269 and the control chamber 267 out of communication with one another.

The two pieces of the guide bar 293 are slotted along their lengths through the passages or bores 277 and 271 in all positions of the bar therein. The slots 307 and 309 abut the said gaskets at one end of their respective lengths and at the other end pass into a cut-back portion 311 at the juncture 301 between the pieces. The slots are adapted to permit passage of air through the bores 271 and 277.

The upper chamber 275 is provided with an exhaust port 313 below said disc 287.

The operation and adaption of the valve is as follows:

Air which is being used for braking purposes is led to the port 281, above the disc 287. This air comes in varying pressures as will be explained again later. Sometimes it is zero when the brakes are not set. It is a maximum (say ninety pounds per square inch) part of the time during which the brakes are being set. At other periods during the braking operation it may be only at fifteen pounds per square inch for effective brake operation.

Now this valve, when used with the pressures quoted, namely fifteen and ninety pounds, has the effective projected areas of the disc 287 and the lower surface of the abutment 303 proportioned in the ratio of 6 to 1, that is, the area of the disc is six times that of the abutment. Hence these areas are in the inverse ratio of the critical pressures noted, namely fifteen pounds and ninety pounds.

Now if high pressure (ninety pounds per square inch) reservoir air passes into the lower port 265, it presses the gasket 295 to a seat on the lower lip 305 by means of its pressure on the abutment. Hence the air can not pass out of the chamber 269. This becomes a fact under the assumption that there is less than fifteen pounds pressure above the disc 287. The then relative positions of the valve parts are as shown in Fig. 26.

Then, if air above fifteen pounds pressure be led into the inlet port 281 above the disc 287, that disc will be depressed and force the upper gasket 295 to a seat on the upper lip 299. This will also result in the lower gasket 295 being pushed from its lower lip 305, and the high pressure (ninety pounds per square inch) air at the port 265 may then pass into the chamber 269, out through the slot 309, through chamber 267 and to the port 263.

At any time that the predetermined pressure (such as fifteen pounds per square inch) is not maintained above the disc 287, the high-pressure air will again close itself off as described, that is, by raising the guide bar and seating the lower gasket 295. When this occurs the high-pressure air in the passages connected with the port 263 may go back through the passage 267, up through the slot 307 and into the chamber 275 and out of the exhaust port 313.

This valve CR may act as an emergency relay where the air which may be led above the disc 287 is at the same pressure as the relayed or valved air.

*Differential emergency valve DEV.*

This valve (Figs. 28 and 29) is quite similar to the said door engine control valve DEC and comprises in its construction many of the parts of that valve with certain modifications to be described.

The larger cylindrical body portion 213, housing the piston 221, has only the one inlet port 227 therein. The port 225 of the said valve DEC has been omitted.

Further, the radius of the former annular lip 247 of the small piston 223 of the valve DEC has been reduced until the area on the piston face surrounded by the lip (now 228) is substantially one-sixth of the area of the large piston 221. The ratio quoted is for the pressure examples used herein, namely fifteen and ninety pounds. In other words it takes only more than fifteen pounds pressure on the large piston to set the mechanism to the non-emergency position shown in Fig. 28.

However when the pressure on the large piston 221 is below the predetermined fifteen pounds, then ninety pounds of air (due to the steering wheel emergency operation hereinafter described) on the small area within the lip of the small piston will throw the valve to the emergency position shown in Fig. 29. Air then passes from the port 231 to the port 229, setting the brakes as hereinafter described.

High-pressure air in chambers joined to the port 229 is exhausted to atmosphere when the small piston is in its non-emergency position shown in Fig. 28.

It is to be understood that the use of fifteen pounds and ninety pounds pressure is only one of many pressure ratios which might be used. Hence the area ratios are only one of many that might be employed.

*Safety control switch SCS.*

Figs. 30 to 33 show the construction of this switch and attendant parts.

The ordinary steering rod SK of the vehicle is provided with the wheel rim W operable on said rod.

Below the hub of said wheel W is a shell or tube 315 for protecting the steering column, to which is fastened by set screws an abutment 317 composed of fiber or other insulating material. This abutment is annular in form and is provided with a shoulder 319.

To the shoulder 319 is screwed an annular metallic cylinder 321, faced outwardly with a shell 323 of insulating material. The cylinder 321 is provided with an upper inwardly turned flange 325. Said cylinder 321 is provided with a lead 327 to the storage battery SB (Fig. 3) of the vehicle or to other source of electric energy.

Slidably fitted to the tube 315 is another metallic tube 329 passing within the confines of the flange 325 and annularly spaced therefrom. Within the cylinder 321 and below the flange 325, this outer tube 329 is provided with an outwardly extending flange 331 adapted to cooperate with said flange 325. A spring 330 reacting on the flange 331 and the abutment 317 tends to hold the two said flanges in contact.

The tube 329 is provided with a lead 333, which connects with the other side of said battery SB (Fig. 3).

Extending substantially radially from said outer tube 329 at the upper end thereof are a plurality of arms 335, 337, and 339. These arms extend out to the peripheral center line of the wheel W. At this point they turn into a direction parallel to the steering rod and pass through the rim of the wheel. The holes through which they pass are insulated.

The wheel is provided on its upper surface with an annular depression 341, adapted to receive a movable member such as a rim or ring 343 adapted to be fastened to the upper ends of said arms 335, 337 and 339 by means of nuts. The said arms are each provided with a shoulder 345 for normally holding the ring 343 a distance up from the depression 341. At such time the tube 329 is under full influence of the spring and the flanges 331 and 325 are in contact, and the steering wheel emergency circuit is closed at this point.

The function of this device is to close the steering wheel emergency circuit at this point when the wheel is not held or gripped, and to break said circuit when said wheel is gripped. When the wheel is gripped the member 343 is depressed into the groove 341, and presses the flanges 331 and 325 out of contact by means of the arms 335, 337 and 339 and the tube 329 to which said arms are fastened.

*Modified form of safety control switch SCS.*

A modified form of the above described switch SCS is shown in Figs. 43 to 46.

Here instead of providing the ring 343 above the wheel W, a ring 344 is provided beneath said wheel W, in an under annular groove 346 thereof. The arms 335, 337 and 339 join this ring 344 to the said slidable tube 329.

In this modified form of switch a cup 348, made of insulating material, is fastened to the steering wheel tube 315, and has fastened on the inside thereof a conducting ring 350. The ring is provided with a lead wire 352. The flange 331 of the slidable tube 329 is adapted to cooperate with said ring 350 when drawn downwardly by the reaction of the tension coil spring 354. The coil spring is fastened to the lower portion of the cup 348 and to the slidable tube 329. Normally it draws the tube 329 downwardly so that the flange 331 thereof cooperates with the ring 350 to close a circuit between said lead wire 352 and another lead wire 356 on the tube 329 to perform the same functions as described above in connection with Figs. 30 to 33.

When the circuit is closed as described the ring 344 is partially withdrawn from the groove 346.

The circuit, as before, may be opened by gripping the steering wheel. This action draws the ring 344 upwardly into the groove 346, whereby the tube 329 slides upwardly against the downward action of spring 354, hence the flange 331 and ring 350 are drawn out of contact and the circuit is opened.

This modified form of switch, although not permitting the driver to rest his hands lightly and conveniently on the wheel while driving, and so hold open the circuit, as is the case in the first form, does prevent the circuit from being held open under emergency conditions by collapse of the driver on the wheel. However, in either modification the driver must have his hand on the steering wheel to prevent a closed circuit or emergency condition. The significance of this will appear later.

It should here be noted that the wire 333 on the steering tube 315 in the first form, or the wire 356 on said tube in the second form may be dispensed with if the tube 315 be used as a ground to the battery.

Safety control valve SCV.

This device is illustrated in Figs. 37 and 38 and its application in Fig. 47.

It comprises a body 347 with an inner chamber 349 therein closed by a cap 351.

A bored bushing 353 is forced into a bore below said chamber. The bushing is provided with a chamber 355 and carries in its bore a double milled stem 357 provided with an upper head 359. A spring 361 reacts between the cap 351 and the head 359 to seat a beveled portion 363, on the under side of said head, into a beveled upper portion 365 of said bore.

A beveled lower portion 367 of said bore is adapted to receive the chamfered top edge of a pin 369 fastened to said stem 357. The pin 369 passes slidably through a bore in a lower cap 371 screwed to the body 347. The cap 371 is provided with a port 373 communicating with the passage between the milled stem 357 and the bushing 353 when said pin 369 is in a downward position. The distance between the beveled portions of the bushing is less than that between the said chamfers associated with the stem parts.

An inlet port 375 connects with the upper chamber 349 and an outlet port 377 with the lower chamber 355.

Operation is as follows:

Air entering the upper chamber through inlet port 375 tends to block itself by seating the upper beveled portions. The spring assists this result.

Air is passed to the outlet port 377 by pressing the pin 369 upwardly whereupon the lower beveled portions seat and the upper ones unseat. The passage 373 is closed.

Release of the pin 369 permits the first named conditions to hold, and air may exhaust from chambers connected to the outlet port 377 through the valve to the exhaust port 373.

The pin 369 is made operative by mounting the valve on an over-reaching bracket which is clamped to the steering column. A hole is drilled therein to permit easy passage of the pin 369 therethrough. (Fig. 47.)

The spring-pressed tube 329 of the previously described steering apparatus is here provided with a sidewardly extending ear 381. This ear holds the valve in its open position when no hand grips the wheel W. This is due to the spring 330, which acts to press the ear upwardly (with the Figs. 30–33 construction; downwardly with the Figs. 43–46 construction) against the pin 369. In this position air may pass from the inlet to the outlet port.

When a hand grips the steering wheel, the tube 329 is depressed and the ear 381 is withdrawn from the pin 369. This cuts off flow of air from the inlet to the outlet pipe but permits air to back from the outlet pipe to exhaust.

Magnet valve M.

This device, shown in Figs. 22 and 23, comprises the above described valve SCV but with its inlet port 375 placed opposite to its position shown in that valve. Also, the valve is inverted, and modified exhaust ports 383 are cast thereto. The stem 369 is replaced by an upwardly extending shank 385 harbored slidably in a bored core 387 screwed to the body 347 of the lower valve. The shank 385 is composed of copper or other non-magnetic material. This shank, like the pin, is beveled to meet the beveled bore of the bushing 353. The upper part of the body 347 in this valve embodiment is formed to a cup 389 enclosing a solenoid coil 391. The coil 391 surrounds said shank 385. The cup 389 is capped with a bored head 393 which receives the loose piston 395, which is made of iron or other magnetic material. The piston rests on said shank 385. The cylindrical portion 397 into which the piston fits has threaded thereto a bored cover 399 which has slidably fitted in its bore an operating button 501. The button 501 rides on the piston 395.

Operation is as follows:

Air is normally kept from passing from the inlet port 375 to the outlet port 377 by the action of its own pressure and the spring 361, as above described for the valve SCV. To permit passage of air through the valve, electric current is led through the solenoid coil 391 whereupon the iron piston 395 is drawn down magnetically, forcing the shank 385 and attendant parts down ahead of it, and air is permitted to pass as above described for the valve SCV. The valve opens quickly.

Upon breaking the coil circuit the valve returns to its original internal relationships under action of the spring 361, and air is exhausted from the outlet port. The return action is relatively slow because the action of the spring is slower than that of the solenoid.

The button 501 serves as a manual control for the valve, its depression accomplishing the same results as a passage of current through the electromagnet.

*Brake-valve AEP.*

This device is shown in Figs. 4, 5 and 6, and is a combined pneumatic and electrical control valve. Its air elements are adapted to cause setting the brakes and its electrical elements are adapted to throw the stoplight SL and the magnet valve M into and out of operation respectively.

Referring to the figures noted, it will be seen that the valve comprises a body 503 on which is screwed a cap 505 adapted to hold down against a shoulder 507 on said body a flexible diaphragm 509. Between the diaphragm and the cap is interposed a sealing gasket 511.

Into an upwardly formed concentric recess 513 of the cap 505 is forced an annular cam 515. The cam has one high portion 517 and one low portion 519 and is of an inverted type.

Rotatably fitted into a central bore of the cap 505 and passing downwardly through the annular cam 515 is a hollow operating post 521 provided with a laterally extending follower 523.

The follower is adapted to follow on the operating surface of the cam. An operating handle 525 is fitted tightly to the post.

The hollow portion of the post is provided with a coil spring 527 which abuts the top of the hollow portion and reacts on an abutment piece 529 bolted centrally on said diaphragm 509.

Movement of the handle, far enough counter-clockwise (Figs. 3, 4 and 34) that the follower rides on the high side of the cam, causes the diaphragm to be depressed.

Mounted upon the body 503 by means of brackets 531 is an arcuate insulating strip 533. This strip is concentrically arranged with respect to the vertical center line of the operating post 521. It has imbedded therein three conducting strips 535, 537 and 539, arcuate in form, and concentrically arranged with respect to said center line. The top surface of the strips is above that of the insulating strip and any fastenings connected therewith. The strips are not physically connected and the strips 535 and 537 have a smaller radius than that of strip 539.

On the handle 525 is provided an extension 541, in line with said handle. This extension reaches out over the arcuate strips and is drilled at two points to slidably receive the vertical pins 543 of a connector shoe 545. Springs 547 are interposed between said shoe and the extension.

The shoe 545 is adapted to reach radially from the inner arcuate strips 535 and 537 to the outer strip 539, and to make connection alternately between the strips 535 and 539 and the strips 537 and 539 as the handle is turned. The inner strips are beveled to facilitate the travel of the shoe thereover.

The length of the arcuate strips is such that the arc of the outer one subtends the angle made by the handle in its total motion. The arc of the inner strips plus the interval between them also subtends said angle.

The strips 535 and 539, when the shoe 545 bridges them, are adapted to close the magnet valve circuit at this point. It will be noted that the strip 535 is a relatively short one. Proper wires are provided for this, as will be described.

The strips 537 and 539, when the shoe 545 bridges them, are adapted to close the stoplight circuit. This wiring also will be made clear later.

Referring now to the base of the valve, the pneumatic operation thereof will be explained and the cooperation between the pneumatic portions and the said electric portions will be made clear. (Fig. 6).

The body 505 has an outlet port 547 screwed into the bottom thereof.

A bored bushing 549 is also screwed into said body from below. The bore is differentially arranged with the smallest diameter below and a slot in the wall of said small diameter bore. The said small bore is met by a beveled smaller bore 551 of a nipple 553 screwed to said bushing. The nipple receives an exhaust pipe.

A second bored bushing 555 is screwed into said body opposite the said bushing. It is provided with a slotted differential bore similar to the one above described. This bore is met by a small bore 557 from below of diameter less than the smaller diameter of the differential bore. The bore 557 is beveled on its lower edge and opens into a larger bore 559. A guide hole 561 leads down from the bore 559.

An inlet passage 563 is provided for the bore 559, as well as a gage passage 565 which leads to a pressure gage.

Two pins 567 and 569 are fitted to the smaller bores of the bushing 549 and 555, respectively. Springs, set into the larger portion of the differential bore, tend to press the pins upwardly by means of shoulders on said pins. The pin 567 is adapted by means of a bevel 566 to seat on the upper beveled portion of the exhaust bore 551 when pressed down. The pin 569 does not seat when pressed down.

Screwed into the pin 569 is a shouldered and upwardly beveled pin 571 adapted to have its bevel seat on a lower bevel of the hole 557 when the pin is forced upwardly by said spring above, and a spring acting therebelow.

A cross-member 573 is adapted to transmit the motion of said diaphragm 509 to the said pins.

Operation of the valve is as follows:

In the position of the handle shown in the figures, which is non-braking position, the inlet port is shut off from the outlet port 547 by the small pin 571, and air from the outlet port 547 may pass to the exhaust port 551. In this position of the handle the brakes are released as far as the brake valve is concerned, and the shoe 545 is adapted to throw the magnet valve into play if other conditions in the electric circuit thereof are conducive to a closed circuit.

If the handle is thrown into any of its other positions the magnet valve circuit is broken and the stoplight circuit is closed.

The ear 523 rides on the high spot of the cam, forces down the diaphragm and the cross bar 573 and by means of the said pins closes the exhaust port and opens the inlet port, permitting air to pass to the outlet port and to the brake diaphragms, which will be described. The amount the spring 527 is compressed determines the pressure at the brakes because when braking pressure builds up beneath the diaphragm 509 to a value determined by said spring, then the valve 567 is lifted slightly due to the rising action of the diaphragm 509. The braking pressure is therefore kept at a given value as determined by the positioning of handle 525.

*Brake diaphragms BD.*

One of these devices is shown in Fig. 36. It comprises a body having two halves 575 and 577 bolted together with a flexible diaphragm 578 therebetween.

The chamber 575 has an air inlet 579 associated therewith. A brake rod 581 passes through a stuffing gland 583 of the half 571 and is provided with a flat plate 585 at its inward end. The plate cooperates with the diaphragm 578. The diaphragm, due to its shape, and the rod 581, due to springs associated therewith, tend to travel toward the port 579 when there is no air pressure. Upon permitting air under pressure to enter the inlet port the diaphragm 578 is pushed toward the other end of its chamber and the brake rod is operated to set the brakes. Release of the air permits the diaphragm to spring back to its former position, forcing the air out of the chamber. The brakes are thus released. The amount the brakes are set is proportional to the air pressure in the lines or chambers associated with the inlet port 579.

*Accelerator mechanism.*

Fig. 20 shows the means by which an AR valve is adapted to become the AR—AD valve.

A valve AR is substantially inverted so that its stem 187 extends upwardly. The stem is provided with a shoulder 186. A coil spring 184 abuts this shoulder and holds up one end of a pivoted accelerator shoe 182. Motion of the shoe in the direction of the arrow indicated, depresses the spring and puts the exhaust port 209 of the valve in communication with its outlet port 207, hence exhausting the outlet air. The inlet, as hereinbefore described (in connection with Figs. 18 and 19) is thereby closed. As will later be described the doors of the coach are thereby closed and of course when the accelerator is depressed it is causing acceleration of the coach.

After seating takes place between the bevel 203 and its seat the spring 184 absorbs the remaining motion of the accelerator shoe or pedal. The spring 184 is relatively stiff so that the valve becomes operable immediately upon operating the pedal.

When the operator releases pressure from the pedal the parts of the valve resume their positions shown in Figs. 18 and 20. Hence the inlet port communicates with the outlet port and the exhaust is shut.

Magnet valve switch MS.

This is a device (Fig. 42) adapted to break the engine ignition EI if desired. It is a modified part of the magnet valve M.

The button 501 is fastened permanently to the dash pot piston 395 of said valve M. The top of the button is provided with a contacting brush 502 adapted to put two electrodes 504 and 506 into electrical communication when the lower air ports of the magnet valve M are out of communication, that is, shut off.

When the valve M is magnetized by current passing therethrough, due to an emergency action of the steering wheel the said air ports go into communication and the brush 502 is drawn from its electrodes.

The engine ignition EI, Fig. 3, may be connected in series, if desired, to said electrodes 504 and 506 as shown by the dotted lines 508 and 510. Hence an emergency action of the steering wheel breaks the engine ignition.

Door operating mechanism.

The linkages extending from the door engines E to the doors 7 and 9 are practically the same for the said front and rear doors 7 and 9.

The operation of the AR—TP valve in conjunction with the rear door treadle holds only for said rear door. The front door is not equipped therewith.

The linkage that is common to the two doors is described as follows (see Figs. 15, 16 and 17).

The door-opening linkage proper comprises a link 113' reaching from the arm 111 to a bell-crank 115 rotatably mounted upon a vertical shaft 11. This bell-crank 115 cooperates through link 119 with the crank arm 121 fastened to a rotatable vertical shaft 123 to which one half of a double folding door is attached. The shaft 123 is geared by means of bevels 125, 127, 129 and 131 and intermediate shaft 133 to the vertical shaft 135 on the opposite side of the door frame. The shaft 135 has fastened thereto the other half of the above mentioned double folding door. Each half of the door has a leaf 137 fastened to one of the vertical shafts and another leaf 139 hinged to said leaf 137. The leaves 139 are equipped with pins 141 extending downwardly into slots 143 in the flooring directly beneath the leaves.

As the door engine moves the shaft 111 from left to right (Fig. 13) the door linkage moves so that cranks 115 and 121 rotate clockwise (Fig. 15) and likewise vertical shaft 123. The manner in which vertical shaft 133 is geared or linked to shaft 123 causes shaft 133 to rotate in an opposite or counter-clockwise direction (Fig. 15). The result of the motions of shafts 123 and 133 is that the leaves 137 are thrown inwardly while the leaves 139 hinged thereto move to the position shown in dotted lines due to pins 141 working in slots 143.

The door operating linkage so far described is operable for both front and rear doors.

Treadle control.

The rear door has a special passenger door control arrangement. This comprises a depression 587 at the rear door. The floor of this depression comprises two steps 589 and 591 integrally formed. These steps are hinged to the frame of the coach at a hinge 593 and form a treadle.

The outer end of the combined steps (beneath the door) is supported by means of a double L section 595 of steel fastened thereto. This L is bored to receive a vertical pin 597 permanently fastened to a portion 599 of the coach frame. This pin has a shoulder formed on the upper end thereof. Between the frame portion of the coach and the bored portion of the L, on said pin is placed a spring 601 adapted to hold the steps in raised position with no passenger thereon. Between said pin shoulder and said bored portion of the L is placed another spring 603 on said pin. The spring is adapted to absorb rebounds of the steps when in use.

Solidly fixed to a part of the coach frame work is the valve AR—TP of the type AR. The stem 187 extends downwardly. It normally engages an L section 600 of steel fastened to the riser of the said steps, that is, when no passenger is positioned on said steps. The valve is normally held in its Fig. 19 position. Hence its outlet side is normally in communication with its exhaust port.

When a weight, such as that of a passenger, rests on either of the steps, said steps are depressed against the reaction of the lower spring 601, the L 601 leaves the downwardly extending pin 187 and said valve takes its Fig. 18 position, in which the exhaust is cut off and the inlet port is in communication with the outlet port.

No matter what the wear may be on the step mechanism, the above operation occurs, because the amount the L 600 leaves the pin 187 is of no consequence to the operation of the valve AR—TP. This construction takes care of the variable weights of passengers also.

Modified treadle control.

In Figs. 39 to 41 are shown a modified form of rear door step having one folding member.

The former two steps 589 and 591 (Figs. 15–17) are replaced by a single step treadle 605, hinged at 607. This is adapted to depress a vertical rod 609 held slidably in bearings 611 attached to the coach frame. As in the original form the mechanism is held in proper position by means of springs 613 and 615. An auxiliary spring 616 assists the action of spring 615, by reacting between said treadle 605 and an angle piece 618 on the coach frame. The rod 609 is provided with a lateral extension 617 which cooperates with the stem 187 of the valve AR—TP similar to the cooperation described between said valve and the L 600 of the preferred form.

The rod 609 is provided with a horizontal member 621. This cooperates with a lug 623 of a folding step 625 when said step is in its horizontal position. The step is operable from its vertical to its horizontal position by means of a linkage $L^1$ operable to let the step down when the doors open and operable from the door opening linkage.

Hence when a passenger steps on the upper, inside step 605, the valve AR—TP becomes operable, the doors may open as will be described, whereupon the outside step goes down.

The weight of a passenger on either the step or treadle 605 or the folding step 625, causes the doors 9 to be held open or to open if other conditions in the pneumatic circuit are set for such operation.

*Folding step linkage.*

This linkage is detailed in Figs. 21 and 41.

It comprises a link 627 pinned to the arm 111 of the door engine. At its other end this link is provided with a downwardly extending pin 629 which reaches through a slot 631 cut into a piece of angle iron 633 bolted to the coach frame. The slot 631 is laterally formed with respect to the length of the coach.

The lower end of the pin 629 is connected loosely to a reach rod 635. The reach rod is pivotally connected to an arm 637 integrally formed with the folding step 625.

The slot 631 and the arm 637 are in line.

Motion of the arm 111 of the door engine E in the direction of the arrow shown in Fig. 21 (door opening motion) causes the linkage to assume the dotted-line position shown in said figure, that is, the pin 629 recedes from the step 625, draws over the reach rod 635, the arm 637 and consequently draws down the step as shown in Fig. 41.

*Pneumatic system SE (Fig. 3).*

Referring now in particular to Fig. 3 the operation of one form of the pneumatic system, namely form SE, will be made clear.

An air compressor C supplies a reservoir R with air at, say ninety pounds per square inch pressure by means of a pipe line 400. The reservoir may comprise one or more tanks adapted to be mounted upon the vehicle. The compressor and reservoir are equipped with proper auxiliaries such as an air strainer S for the compressor and for the reservoir, relief cocks C and a safety valve Z. If more than one tank is employed such as is shown in said Fig. 3, a connecting line L is provided for each added tank.

Leading from the reservoir R to the inlet of the driver's brake valve AEP is a direct air pipe line 401. This line 401 has four branch lines under reservoir pressure. Branch 403 supplies a sight gage 405 by means of which the driver reads the pressure conditions in the reservoir and attendant lines. Branch 407 supplies the inlet 265 of the direct control relay valve $CR^1$ with air at reservoir pressure. Branch 409 supplies the door engine-control valve $DEC^1$ with air at reservoir pressure at the said valve's door-closing or small-piston end DC. Branch 411 supplies the differential engine-control valve $DEC^2$ with air at reservoir pressure at the said valve's door-closing or small-piston end DC. The pistons are diagrammatically shown in the pipe diagrams.

The branch line 411 has a sub-branch 413 thereon adapted to lead air at reservoir pressure to the magnet valve M and the emergency relay valve $CR^2$ by means of short lines 415 and 417 respectively.

The differential valves $DEC^1$ and $DEC^2$ under normal running conditions (no brakes being used) have their small pistons forced from over their respective ports by means of pressure in the lines 409 and 411, thereby permitting air at reservoir pressure to reach the door-closing sides $dc$ of the door engines $E^1$ and $E^2$, that is, by means of short lines 419 and 421. This causes the doors to be held shut.

The pipe lines of the system SE so far enumerated will hereinafter be described cumulatively as the main reservoir pressure lines operating at, say ninety pounds square inch, continually with the exception of the short lines 419 and 421, which carry said pressure most of the time, that is, when the doors are closed.

The relatively short length of pipe that continually carries the reservoir pressure is subject to less leakage than the complete system would be, were all of said system or most of it continuously under this relatively high reservoir pressure. This is one source of economy in the present invention.

The lines next to be described receive air from the said main reservoir lines by way of the brake valve AEP. The valve is shown in brake-release position in Fig. 3.

From the brake valve AEP is provided a line 423 which leads to a check valve $K^1$. From the check valve $K^1$, a line 425 leads to a cross line 427 which leads air to the two brake operating diaphragms 429. These diaphragms operate the brakes on the wheel drums simultaneously.

Leading from the said line 423 is a branch line 431 which leads to the upper side of the diaphragm of the said direct control relay valve CR$^1$.

It is evident that the brake valve AEP, upon being turned far enough counter-clockwise from its brake release position shown in Figs. 3 and 6, will close its exhaust and thereafter cause air from the said main reservoir lines to enter the line 423 from whence it passes to the brake diaphragms 429 by way of check valve K$^1$ and lines 425, 427 and also to the top of relay valve CR$^1$ by way of line 431.

A vehicle which is being brought to a standstill by means of a frictional brake should have the pressure on the braking surfaces somewhat relieved just as a standstill is about to be reached, in order to avoid jolting the vehicle and passengers therein. Hence the air pressure in the said lines 423, 431, 425 and 427 is manipulated by means of said valve AEP to bring about the required results mentioned for the braking surfaces. The variable braking effect is of course brought about by means of the diaphragms 429 which act under the variable pressure. Therefore the lines 423, 425, 427 and 431 are subjected to pressures varying from ninety pounds per square inch gage to about fifteen pounds per square inch gage while braking, and to zero pressure gage while not braking. These lines will hereinafter be called variable pressure lines.

The outlet side of the direct control relay valve CR$^1$ is provided with a line 433 connecting said relay to the operator's rear control valve CST$^3$. The line 433 has two branches. One branch 435 leads to the accelerator door valve AR—AD. The other branch 437 leads to a cross line 439 which interconnects two valves CST$^1$ and CST$^2$, said valves being of the described CST type.

The valve CST$^1$ is operated by the street fare taker and the valve CST$^2$ by the conductor. The door closing ports DC of these valves are plugged, as described hereinbefore.

The lines 433, 435, 437 and 439 are filled with air at reservoir pressure only when the said variable pressure lines are at a pressure of fifteen pounds or more. These lines will hereinafter be called relayed high-pressure lines. The lines feed the remainder of the circuit with high pressure air through various manually operated valves, the connections for which will now be described. The remainder of the air lines in the system will be known as high pressure operating lines.

The outlet of the accelerator door valve AR—AD is connected to the door opening side DO of the differential engine control valve DEC$^1$ by means of a line 441. The same end DO of said valve DEC$^1$ is connected to the door opening side do of the said door engine E$^1$. This connection is made by way of a line 443, a check valve K$^2$ and a short line 445 from the outlet of said check valve.

The check valve K$^2$ is connected with a check valve K$^3$ by means of a line 447. Said check valve K$^3$ is connected to the door opening side do of door engine E$^2$ by a short line 449 from the outlet of the valve. The other inlet side of the check valve K$^3$ is connected to the door opening end DO of the differential valve DEC$^2$, by means of a line 451.

A branch line 453 from said line 447 connects the line 447 with the said check valve K$^1$. A lead 455 from the line 453 brings air from the said emergency relay CR$^2$. The space above the diaphragm of the relay CR$^2$ is connected with the outlet side of the magnet valve M by means of a line 457.

The operator's rear control valve CST$^3$ has its outlet side connected to the pilot treadle valve AR—TP by a line 459. The valve CST$^3$ comprises the described CST valve with DC port and exhaust plugged.

The pilot treadle valve AR—TP has its outlet side connected with a check valve K$^4$ by means of a line 461. The outlet of said check valve K$^4$ leads by way of line 463 to the door opening side DO of the differential valve DEC$^2$. This same check valve K$^4$ has its other inlet side connected with the outlet of a check valve K$^5$ by means of a line 465. The inlets of said check valve K$^5$ each connect with the outlets of said valves CST$^1$ and CST$^2$ by means of lines 467 and 469 respectively.

The application of the electric circuits used in connection with the safety control switch SCS of the steering column will now be described.

A storage battery SB which gives a general supply of electricity for lighting and other purposes to be described, is carried by the coach.

A lead 471 from, the say negative side of this batttery, leads to one side of the safety control switch SCS on the steering column. A snap switch SS is provided in this line for breaking the battery circuit intentionally and manually.

The other side of the safety switch SCS is connected to the one end of the outer arcuate strip 539 of the brake valve AEP by means of a wire 473. The other end of said strip is connected to one side of the stop light or signal SL at the rear of the coach by means of a line 475. The stop light is also connected with the say plus side of the said battery SB by means of leads 477 and 479.

The lead 479 is connected with the short inner arcuate strip of the brake valve AEP by way of leads 481 and 483 and the coil 391 of the magnet valve M in series therewith.

The longer inner arcuate strip of said valve AEP is tied with the said lead 471 by means of a lead 485.

The engine ignition EI is connected across the lines 471 and 475. The switch SS is between the engine ignition and the battery SB.

*Pneumatic system SP (Fig. 34.)*

Another form SP of the system SE is illustrated in Fig. 34. This system has had the following changes made from the described system SE of Fig. 3.

The brake valve AEP has had all electrical connections on contacting arcs removed therefrom. The safety control switch SCS on the steering column has been replaced by the safety control valve SCV. No electrical connections connect the brake valve and steering wheel switch with each other or with the battery. No magnet valve or connections therefore are used.

The former line 457 instead of connecting with the said magnet valve leads now to the small piston outlet of a differential emergency valve DEV. The inlet for the large piston side of said valve DEV is joined to the said line 423 by means of a line 487 which becomes one of the said variable pressure lines.

The small piston inlet of the valve DEV is connected with the outlet of the safety control valve SCV used in connection with the safety steering column. This is done by means of a line 489, which becomes a high pressure operating line.

A line 491 connects the inlet side of the valve SCV on the steering column with the said line 403. The line 491 becomes a main reservoir line.

The only electric lines used for the system SP are a line 493 connecting one terminal of the battery to a terminal of the rear signal light SL.

The other terminal of the battery is connected to one terminal of a stoplight contact SLC by means of a line 495.

A line 497 connects the remaining terminals of the stoplight SL and contact SLC. Operation of the diaphragms 429 to braking position is adapted to close contact between the terminals 430 of the stoplight contact SLC and a connecting bar 432 therebetween (Fig. 35).

*One-man operation.*

Referring first to the embodiment SE shown in Fig. 3, and assuming one-man operation of the coach, the following explanation of operation may be made:

(a) Assuming the vehicle is approaching a station and passengers wish to enter. (The reservoir is assumed to be filled with air at, say, ninety pounds per square inch pressure.)

The driver, who is holding the steering wheel with one hand, applies the brakes by means of the brake valve AEP. This causes the stoplight to light up by means of the circuits connected with the strips 537, 539 and the shoe 545 (see Figs. 4 and 6). The snap switch SS is assumed to have been turned on when the coach was started on its run.

This turning of the handle of the valve AEP from the position shown in Fig. 3 applies pressure to the variable pressure lines from the main reservoir lines. Full air pressure may build up in line 423, through check valve $K^1$, and line 425 to set the brakes by means of the diaphragms as described.

The line 431 has a pressure rise therein also. This fact causes the relay valve $CR^1$ to distribute high pressured air to the relayed high pressure lines. Hence high pressured reservoir air enters lines 433, 435, 437 and 439. Various valves block further travel of said air.

The coach nears a standstill. In order to make a smooth stop the driver relieves the air in the variable pressure lines by returning the valve AEP to its normal release position (Figs. 3, 4, 5 and 6). This relieves the pressure on the brakes by exhausting air from the valve AEP. He may relieve the air pressure in the variable pressure lines down to fifteen pounds per square inch, but hardly less than this as the brakes should have some pressure thereon. The driver's relieving action does not impair the relaying action of the relay valve $CR^1$ because of the area ratios therein being 6:1, which is the inverse ratio of 15:90, the respective pressures assumed. Any pressure above fifteen in the line 431 will keep the relay valve open, as described.

It is assumed that in stopping the coach the accelerator was permitted to spring up (to stop the gas feed). Hence the valve AR—AD (Fig. 20) permits passage of high pressure air from the line 435 to the line 441. Previous to this juncture air in the main reservoir line 401 had fed air to the line 409 through the DC end of valve $DEC^1$ to the *dc* side of the door engine $E^1$, hence holding the door shut.

Now the high pressure air in line 441 acting on the large piston in the DO side of the $DEC^1$ valve causes the DC side thereof to be shut off. Then air passes through the open side DO of the valve $DEC^1$, through line 443, check valve $K^2$ and to the door-opening side *do* of the engine $E^1$. The door opens while air from the side *dc* of the engine $E^1$ goes to the exhaust of the valve $DEC^1$ as described.

It is to be understood with regard to the accelerator pedal that the gas feed is adapted to stop completely before further letting up of the pedal effects the door opening operation described. Hence the car could be stopped without opening the front door by holding the accelerator pedal down slightly.

The front doors 7 are now open and passengers are free to enter and take seats. Fares may be deposited in the box BO.

(b) Now, had a passenger desired to get off, he evidently would approach the rear doors 9 after giving his signal. The treadle step is at the rear doors in either modification (Figs. 15–17 or Figs. 39–41) and the passenger would step on the treadle.

This would cause the valve AR—TP to open for passage of air. If then the driver would (coach stopped) turn on the valve $CST^3$ then (provided the brakes are on) air is fed from line 433 into the high pressure operating line 459, through the opened treadle pilot valve AR—TP, through line 461, check valve $K^4$, large pistoned end DO of the valve $DEC^2$ through line 451, through check valve $K^3$ to the door-opening side $do$ of the door engine $E^2$, whereupon the rear doors 9 would open to release the passengers. The operation of the engine $E^2$ and its valve $DEC^2$ is similar to the explained operation of the engine $E^1$ and its valve $DEC^1$.

It will be noted that it requires both the will of the driver and the positioning of a passenger on the treadle to accomplish opening of the rear doors. Hence if no passenger wishes to alight, inadvertent throwing of the valve $CST^3$ will not open the doors with a consequent unnecessary draft on passengers. However a passenger can not release himself. The driver must wilfully subscribe to the passenger's leaving by operating his valve $CST^3$ to door-opening position.

If the driver fails to hold the brakes set with at least fifteen pounds air pressure the relay $CR^1$ will fail to deliver high pressure air as described and no doors may be opened, due to the air in the door-closed end $dc$ of the engines $E^1$ and $E^2$.

At the completion of the loading and unloading operation the valve AEP is returned to its original (release) position and the car is accelerated by means of the accelerator. Ordinarily the driver also returns the handle of the $CST^3$ valve thereby exhausting the line 459. The lines between the door-opening side $do$ of the door engine $E^2$ and the side DO of the valve $DEC^2$ are exhausted at the latter valve and the lines between the valve $DEC^2$ and the treadle valve AR—TP exhaust at said treadle valve. Should the driver not return the handle of the $CST^3$ valve the doors close anyway after a passenger alights, because the lines exhaust as described.

The lines of the engine $E^1$ exhaust in a manner similar to those of the engine $E^2$ and the line 441 exhausts at the accelerator valve AR—AD.

The door engines go to closed position because of the preponderance of air pressure in the door closing ends $dc$ thereof, after pressure is released in the door opening ends $do$. In other words, the differential effect of the pistons of valves $DEC^1$ and $DEC^2$ is lost when little or no pressure is had on the large pistons.

Hence we have the coach under way again.

Let it now be supposed that an emergency occurs wherein the driver is caused to lose his hold on the steering wheel while the brakes are off. The safety control switch (Figs. 30–33 or Figs. 43–46) goes into contact. This closes the following circuit: safety contact switch SCS, line 473, strip 539, shoe 545, strip 535, wire 483, through the magnet valve M opening the air line of said valve M, wire 481, battery SB, line 471, switch SS and back to the switch SCS.

High pressure air released by the magnet valve M passes through the line 457, thereby opening the emergency relay valve $CR^2$ differentially. High pressure air then passes from the lines 413, 417 through the relay $CR^2$, line 455, line 453, line 447 to the check valves $K^2$ and $K^3$ from whence it goes to the door-opening side $do$ of the door engines. This air has not gone through the differential valves $DEC^1$ and $DEC^2$, hence there is no exhausting from the door-closing side $dc$ of the engines $E^1$ and $E^2$; with the result that now the doors are pneumatically in balance and they may easily be operated manually. Hence passengers may open the doors and leave the coach.

The coach is quickly stopped because some of the air from line 453 passes through the check valve $K^1$ to the said line 425 to set the brakes quickly.

Due to the magnet valve switch MS, the ignition of the motor is cut off. This is a feature which might only be desirable under certain conditions so that the connections therefor in Fig. 3 are shown by dotted lines 508 and 510.

Therefore it is evident that in case of accident to the driver the coach is quickly stopped and the passengers can open the doors.

Had the driver, while the coach was normally stopped and while the handle of the valve AEP was over the contacts 535 and 539, in non-braking position, left the coach, similar results would obtain. The operation of the air lines and electric circuit would be the same as if he had let go of the steering wheel while the car was in motion.

Since the driver would in leaving the coach use the door 8, the passengers would not have the main doors opened to blow a draft on them. However, the main doors 7 and 9 would be in balance and therefore easily operable by a passenger should one wish to leave the car.

It is not desirable that the doors be put into balance as long as the brakes are applied under control of the driver as he is then assumed to have control of the coach. Hence whenever the driver applies the brakes by means of the valve AEP no emergency action can take place in so far as contact has been broken in the magnet valve circuit at the valve AEP.

Closing of the steering wheel safety switch, beside setting the brakes, lights the stop light.

When the operator wishes to leave the car, he notches the accelerator pedal in an intermediate position where no gas is fed and where it is in non-door-opening position. The driver may put the pedal in door-opening position (Fig. 20), however.

Operation by driver and conductor.

If a conductor is stationed at the valve $CST^2$ he may apply his operating lever and make this valve operable to pass air from the relayed high pressure line 437 to the line 469; check valve $K^5$, whence the air may pass to the door engine $E^2$ to open the door as described. This means that one more man may have control of the rear doors 9. This relieves the driver from operating the valve $CST^3$. When the conductor shuts his valve, the lines between the valve $DEC^2$ and his valve exhaust back to the conductor's valve exhaust.

The conductor's valve is located at the rear of the coach, see Figs. 1 and 2. He has no control over the front door.

Operation by driver, conductor and street fare collector.

If beside a conductor, there is provided a street fare collector outside of the coach, said collector may by appying his operating lever to the outside valve $CST^1$ (Figs. 1, 2 and 3), load the coach, say in queue fashion. This is done in conditions of congestion where it is advisable to permit passengers to enter the coach at the rear doors 9 as well as at the front doors. The street fare collector takes their fares.

The street fare collector's valve $CST^1$ acts like the valve $CST^2$ of the conductor with which it is connected in parallel.

Due to the construction of the CST valves neither the conductor nor street fare collector can remove the valve handle without leaving the valve in door-closing position. Both parties need the valve handles, and to remove them the valves must be in their door-closing position. Hence the collector cannot permit a coach to proceed without putting his valve in door-closing position because he needs his operating handle to operate the doors of the next coach.

Entering passengers, by means of their weight on the treadle with consequent holding open of the doors by means of the valve AR—TP, prevent having doors slammed on them by a thoughtless conductor or street collector.

Certain features of SP system (Fig. 34).

The system SP shown in Fig. 34 operates like the above described one in all details except the stoplight and the emergency details.

With regard to the stoplight, when the driver applies the brakes, the stop light contactor is made to close the circuit 497, 495, 493 by means of the linkage LG operable from the diaphragm rod 581 (Figs. 1, 35 and 36).

The bar 432 of the contactor SLC closes the circuit.

With regard to the emergency features, the absence of electrical features on the stering gear has been noted.

Here, when an emergency occurs such that the driver loses his grasp on the wheel, the safety control valve SCV on the steering column is caused to pass air to the line 489 as described. This air passes to the small piston end of the differential emergency valve DEV. It is high pressured air and its action on the small piston is to push said piston aside and pass by means of the line 457 to the relay valve $CR^2$ to act as herebefore described. Air enough in the line 487 due to a braking operation of the valve AEP will forestall an emergency braking action due to the action of the large piston of the valve DEV. This is as it should be as no emergency braking action is required when the brakes are already on. The system operates to set the brakes (if they are not set) and to put the doors in a manually operable condition.

The line 487 brings air from the variable air pressure line 423 to the large piston side of said valve DEV. Whenever the air pressure therein is over 15 lbs. per square inch, that is, enough to set the brakes, the large piston acts to cause the small piston to permit no passage of air through the small piston end of the valve. Hence there is no emergency action. The driver is assumed to be attending to controlling the coach if he operates the brakes.

The line 457 exhausts into the valve DEV and the lines 487 and 423 into the brake valve AEP.

It may sometimes be desirable to have the treadle valve AR—PT operable at the will of a passenger. The rear treadle is then entirely eliminated and the valve AR—TP placed high enough above the floor that a passenger may operate the stem 187 thereof manually.

Component portions of the system may be used separately or in combination with any or all other parts of the system.

Advantages.

Emphasis of the following advantages will serve to clarify the operation of this vehicle.

(1). Doors are held shut by reservoir pressure, which is equalized automatically under certain emergency conditions, so that occupants or others may open the doors manually. Passengers cannot be trapped in a dangerous situation.

(2). Separate air is used for closing and opening the doors. This makes both actions positive.

(3). When the operator takes his hand from the steering wheel four things happen, i. e., (*a*) the brakes are set; (*b*) the air pressure on the door engines is equalized; (*c*) the stop light is lit; (*d*) the ignition is killed.

(4). The operator is forced to use the enumerated safety features or his engine ignition will not be operable to start the engine. (See snap switch.)

(5). The system has an inherently low leakage factor because few pipes are under constant reservoir pressure. This is of advantage on a coach where air compressors must needs be small.

(6). The door operating mechanisms are interlocked with the brake operating mechanism without putting full reservoir pressure in the brake diaphragms. This saves air which would be required to bring up the pressure after a semi-release of the brakes. It also saves the time which would be required to do this.

(7). The system employs no emergency air line but comprises emergency features.

(8) The system involves few interlocking cams or levers.

(9). Wear does not impair the operation or adjustments of the treadle mechanism.

In view of the above, it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

I claim:

1. A control system for vehicles comprising an air reservoir, main reservoir pressure lines connected therewith, variable pressure lines connected with said reservoir lines, relayed high pressure lines adapted to receive air from said reservoir lines when said variable pressure lines are above a given low pressure, said relayed lines being adapted to distribute air to various operating devices.

2. A control system for vehicles comprising an air reservoir, main reservoir pressure lines connected therewith, variable pressure lines connected with said reservoir lines, relayed high pressure lines adapted to receive air from said reservoir lines when said variable pressure lines are above a given low pressure, said relayed lines being adapted to distribute air to various operating devices by means of high pressure operating lines.

3. A control system for vehicles comprising an air reservoir, main reservoir pressure lines connected therewith, variable pressure lines connected with said reservoir lines, and relayed high pressure lines adapted to receive air from said reservoir lines, means for operating vehicle brakes from the variable pressure lines at and above a predetermined low pressure; and means for opening a vehicle exit operable from the relayed high pressure lines, said relayed pressure lines being operable at and above said predetermined low pressure in the variable pressure lines, whereby said exit may be opened irrespective of certain pressures in said variable pressure lines.

4. A control system for vehicles comprising an air reservoir, main reservoir pressure lines directly connected therewith, variable pressure lines connected with said reservoir lines by means of a valve, relayed high pressure lines adapted to receive air by means of a relay from said reservoir lines when said variable pressure lines are above a given low pressure, said relayed lines being adapted to distribute air to various operating devices.

5. A door-opening system for motor coaches comprising an entrance door, an exit door, pneumatic means for controlling said doors at the will of a driver, the operation of said exit door being governed by a passenger's motions within the coach as regard said passenger's leaving said coach, and means for putting the exit door under the independent control of either or both of two extra operators without changing the structure of the system.

6. A door-opening system for motor coaches comprising an entrance door and an exit door, means for operating said entrance door under control of a driver, means for operating said exit door under control of said driver, said last named control depending upon a passenger's movements within said coach regarding said passenger's leaving the coach and inherent means for controlling said exit door said last named means of control being under independent control of either or both a conductor and street collector should either or both be on duty.

7. A control system for vehicles comprising an air reservoir, main reservoir pressure lines communicating therewith, variable pressure lines connected with said reservoir lines by means of a brake valve, said variable pressure lines being adapted to operate the brakes of the vehicle, relayed high pressure lines adapted to receive air from said reservoir lines when said varaible pressure lines are above a given low pressure, said relayed lines being adapted to distribute air to various operating devices.

8. A control system for vehicles comprising an air reservoir, main reservoir pressure lines communicating therewith, variable pressure lines connected with said reservoir lines by means of a brake valve, said variable pressure lines being adapted to operate the brakes of the vehicle, relayed high pressure lines adapted to receive air from said reservoir lines when said variable pressure lines are above a given low pressure, said relayed lines being adapted to distribute air to various operating devices by means of high pressure operating lines and valves, said devices including door operating engines.

9. A control system for vehicles comprising an air reservoir, main reservoir pressure lines communicating therewith, variable pressure lines connected with said reservoir lines by means of a brake valve, said variable pressure lines being adapted to operate the brakes of the vehicle, relayed high pressure lines adapted to receive air from said reservoir lines when said variable pressure lines are above a given low pressure, said relayed lines being adapted to distribute air to various operating devices, and electrical connections in conjunction with said brake valve whereby a stop light is lit when the brakes are applied.

10. A control system for vehicles comprising an air reservoir, main reservoir pressure lines communicating therewith, variable pressure lines connected with said reservoir lines by means of a brake valve, said variable pressure lines being adapted to operate the brakes of the vehicle, relayed high pressure lines adapted to receive air from said reservoir lines when said variable pressure lines are above a given low pressure, said relayed lines being adapted to distribute air to various operating devices, and electrical connections in conjunction with said brake valve whereby a stop light is lit when the brakes are applied, and whereby under emergency conditions, air valves may become operable to put the doors of the vehicle into manually operable condition.

11. A door opening system for vehicles comprising a reservoir, a door engine for opening doors, held to door closing position by air from said reservoir, and means for exhausting said air and feeding other air to put the engine in door opening position.

12. A door opening system for vehicles comprising a reservoir, a door engine for opening doors, held to door closing position by air from said reservoir, and means for exhausting said air and feeding other air to put the engine in door opening position, said means comprising a differential pistoned valve adapted to have its large piston face the pressure of the door opening air in order that when said door opening air is sent to the valve, it may pass and cause the door closing air to be shut off and exhausted from said engine.

13. A door opening system for vehicles comprising a reservoir, a door engine for opening doors, held to door closing position by air from said reservoir, and means for exhausting said air and feeding other air to put the engine in door opening position, said means comprising a double pistoned valve adapted to have one of its pistons face the pressure of the door opening air in order that when said door opening air is sent to the valve, it may pass and cause the door closing air to be shut off by the other piston and exhausted from said engine.

14. A door operating combination for vehicles comprising a reservoir, a door engine for opening doors, held to door closing position by high pressure air from said reservoir, and means for exhausting said high pressure air and feeding other air of equal or lower pressure to said engine to put it into door opening position, said means comprising a differential pistoned valve adapted to have its large piston face the said low pressure air when said air is sent to the door opening side of the engine, and thereby permit said air to pass and also thereby to cut off the said high pressure air, permitting part of it to escape; and a check valve at the door opening connection of the engine which permits passage of said low pressure air to the door-opening side of the engine under ordinary conditions and passage of high pressure air thereto under emergency conditions so that the door engine is in equilibrium and manually controllable, the last named high pressure air not being permitted to proceed to said pistoned valve to cut off said first named high pressure air.

15. An interlocking control system for doors and brakes of vehicles comprising an air reservoir, main reservoir air lines connected directly therewith, door engines comprising door opening and door closing chambers, said last named chambers being fed by said lines, a brake valve adapted to feed air variably to variable pressure lines connected with the brake operating mechanism of the vehicle, relayed high pressure operating lines adapted by means of a relay valve in the reservoir lines to make the door opening chambers of said door engines operable to effect door opening when the pressure in said variable pressure lines is below that of the reservoir.

16. An interlocking control system for doors and brakes of vehicles comprising an air reservoir, main reservoir air lines connected directly therewith, door engines comprising door opening and door closing chambers, said last named chambers being fed by said lines, a brake valve adapted to feed air variably to variable pressure lines connected with the brake operating mechanism of the vehicle, relayed high pressure operating lines adapted by means of a relay valve in the reservoir lines to make the door opening chambers of said door engines operable to effect door opening when the pressure in said variable pressure lines is below that of the reservoir, a switch adapted when an emergency occurs, to operate another valve in connection with said reservoir lines and thereby to transmit high pressure air to the door opening side of said engines to put them into balance.

17. An interlocking control system for doors and brakes of vehicles comprising an air reservoir, main reservoir air lines connected directly therewith, door engines comprising door opening and door closing chambers, said last named chambers being fed by said lines, a brake valve adapted to feed air variably to variable pressure lines connected with the brake operating mechanism of the vehicle, relayed high pressure operating lines adapted by means of a relay valve in the reservoir lines to make the door opening chambers of said door engines operable to effect door opening when the pressure in said variable pressure lines is below that of the reservoir, and means in conjunction with said brake valve whereby, when an emergency occurs, another valve in connection with said reservoir lines is caused to transmit high pressure air to the door opening side of said engines to put them into balance.

18. A differential control valve comprising a differentially bored cylinder and differential pistons therein, inlet ports at the ends of the cylinder, an exhaust port centrally thereof, and outlet ports, said pistons being each adapted to permit passage from an inlet port to an outlet port at one end of their travel and adapted to permit communication between an outlet and the exhaust port at the other end of their travel, said operations taking place alternately for the pistons.

19. A differential control valve comprising a differentially bored cylinder and differential pistons mounted in tandem therein, inlet ports at the ends of the cylinder, an exhaust port centrally thereof and outlet ports, said pistons being each adapted to permit passage from an inlet port to an outlet port at one end of their travel and adapted to permit communication between an outlet and the exhaust port at the other end of their travel, said operations taking place alternately for the pistons.

20. A differential control valve comprising a differentially bored cylinder and differential pistons mounted in tandem therein, and having effective areas inversely proportioned to the lowest operating pressures to be used therewith, inlet ports at the ends of the cylinder, an exhaust port centrally thereof and outlet ports, said pistons being each adapted to permit passage from an inlet port to an outlet port at one end of their travel and adapted to permit communication between an outlet and the exhaust port at the other end of their travel, said operations taking place alternately for the pistons.

21. A differential emergency valve comprising a differentially bored cylinder and differential pistons therein, inlet ports at the ends of the cylinder, an exhaust port centrally thereof and an outlet port in connection with the small cylinder, the piston thereof being adapted to permit passage from the inlet port of the small bore to the outlet port thereof when the piston is at one end of its travel and adapted to permit communication between the outlet port and the exhaust port at the other end of its travel.

22. A differential emergency valve comprising a differentially bored cylinder and differential pistons mounted in tandem therein, and having effective areas inversely proportioned to the lowest operating pressures to be used therewith, inlet ports at the ends of the cylinder, an exhaust port centrally thereof and an outlet port in connection with the small cylinder, the piston thereof being adapted to permit passage from the inlet port of the small bore to the outlet port thereof when the piston is at one end of its travel and adapted to permit communication between the outlet port and the exhaust port at the other end of its travel.

23. A pneumatic brake system comprising means including a valve for setting and releasing brakes, means for throwing apparatus into electrical circuit when said valve is in non-braking position and means for throwing a stop light into operation when said valve is in braking position.

24. A pneumatic brake system comprising means including a valve for setting and releasing brakes, means for throwing apparatus into electrical circuit when said valve is in non-braking position and means for throwing a stop light into operation when said valve is in braking position, said second named means being also adapted to throw a safety control switch into circuit.

25. A safety steering wheel, comprising a wheel and a switch, said switch being adapted to be put into open circuit position when the wheel is gripped for purposes of driving.

26. A safety steering wheel comprising a rim, a member movable relatively thereto and cooperating with said rim, a slidable member to which said first member is fastened and a switch cooperating with said slidable member, said switch being adapted to be held in open position when said rim and first member are gripped.

27. A safety steering wheel comprising a rim, a member movable relatively to said rim and cooperating with said rim, and brake-setting means cooperating with said member, said means being adapted to be held in inoperative position when said rim and member are gripped, and to operate when said rim and member are released.

28. A safety steering wheel comprising a rim, a rim cooperating with said first rim, and a valve cooperating with said second rim, said valve being adapted to block the passage of fluid therethrough when the rims are held together and adapted to permit passage of fluid therethrough when said rims are permitted to separate due to relaxation of a grip thereon.

29. A safety steering wheel comprising a rim, a rim cooperating with said first rim, a member to which said movable rim is fastened and a valve cooperating with said member, said valve being adapted to block the passage of air therethrough and to exhaust air therefrom when the rims are held together and adapted to permit passage of air therethrough when said rims are permitted to separate due to relaxation of a grip thereon.

30. In combination, a brake valve for a motor coach and a steering gear therefor, an electric safety switch operable in connection with said gear and operable to open circuit position when said gear is gripped at the wheel thereof and electrodes on said valve adapted to be put in circuit with said switch when the brake valve is set to non-braking position.

31. In combination, a brake valve for a motor coach, a steering gear therefor and pneumatically operable doors, an electric safety switch operable in connection with said gear and operable to open circuit position when said gear is gripped at the wheel thereof and electrodes on said valve adapted to be put in circuit with said switch when the brake valve is set to non-braking position, said connected electrodes and said switch when closed being adapted to put into operation devices whereby said doors are put into equilibrium.

32. A door-opening system for motor coaches, operable to open the rear door by an operator outside the coach irrespective of passengers' positions within, and operable to open the rear door by an operator within the coach, said last named operator's action depending upon a passenger's intention to leave the coach, such intention comprising movement to a position behind the door.

33. A door-opening system for motor coaches, operable to open the rear door by an operator outside the coach irrespective of passengers' positions within, and operable to open the rear door by either of two operators within, one of said last-named operator's action depending upon a passenger's intention to leave the coach, said intention comprising movement to a position behind the door.

34. A pneumatic system for vehicles comprising pneumatic means for variably setting brakes and simultaneously providing high pressure air to open the doors regardless of the pressure used in setting the brakes.

35. A pneumatic system for vehicles comprising pneumatic means for variably setting the brakes and simultaneously providing high pressure air to open the doors regardless of the pressure used to set the brakes, said means comprising a brake valve intercepting variable pressure lines from high pressure lines and a relay valve operable to connect and disconnect said high pressure lines to and from the door operating lines, said relay valve being under control of said variable pressure lines down to a predetermined minimum pressure in said variable pressure lines.

36. Means for permitting egress from a vehicle comprising a door operable to open position, a valve operable to permit opening and closing of said door by way of other valved apparatus, a treadle adapted to receive the weight of an outgoing passenger, said treadle cooperating, when unweighted, with said valve to put the valve in door closing position and adapted, when weighted, to go out of cooperation with said valve thereby permitting it to move to a door opening position.

37. Means for permitting egress from a vehicle comprising a door operable to open position, a valve operable to permit opening and closing of said door, a treadle adapted to receive the weight of an outgoing passenger, said treadle cooperating, when unweighted with said valve to put the valve in door closing position and adapted, when weighted, to go out of cooperation with said valve, thereby permitting it to move to a door opening position.

38. Means for permitting egress from a vehicle comprising a door, a door engine therefor adapted to close said door upon receiving air through one side of a differential valve and adapted to open said door upon receiving air through the other side of said valve, whereby the passage through the first named side is cut off and the door closing air permitted to exhaust; a second valve in series with said first second side of said valve adapted to open upon depression of a treadle away from said valve.

39. Means for permitting egress from a vehicle comprising a door, a door engine therefor adapted to close said door upon receiving air through one side of a differential valve and adapted to open said door upon receiving air through the other side of said valve, whereby the passage through the first named side is cut off and the door closing charge of air permitted to exhaust, an air valve in series with said second side of said valve adapted to open upon depression of a treadle away from said valve, said treadle being automatically operable to depressed position by weight of a passenger thereon.

40. Means for permitting egress from a vehicle comprising a door, a door engine therefor adapted to close said door upon receiving air through one side of a differential valve and adapted to open said door upon receiving air through the other side of said valve, whereby the passage through the first named side is cut off and the door closing charge of air permitted to exhaust, an air valve in series with said second side of said valve adapted to open upon depression of a treadle away from said valve, said treadle being automatically operable to depressed position by weight of a passenger thereon.

41. A control for vehicle doors comprising a door engine, means for ordinarily holding said engine to door closed position, means for causing said engine to take a door opening position, said means being under automatic control of a leaving passenger, means under control of the driver for making the passenger controlled means inoperative, a third means, manually controlled, for operating said engine to door open position, said third means being independent of the first two means recited.

42. A control for vehicle doors comprising a door engine, means for ordinarily holding said engine to door closed position, means for causing said engine to take a door opening position, said means being under automatic control of a leaving passenger, and means under control of the driver for making the passenger controlled means inoperative.

43. A control for vehicle doors comprising a door engine, means for ordinarily holding said engine to door closed position, means for causing said engine to take a door opening position, said means being under automatic control of a leaving passenger, means under control of the driver for making the passenger controlled means inoperative, a third means for operating said engine to door open position, said third means being independent of the first two means recited, a fourth independent means for putting said door engine in pneumatic equilibrium whereby all of said previously named means are rendered inoperable.

44. A control for vehicle doors comprising a door engine, means for ordinarily holding said engine to door closed position, means for causing said engine to take a door opening position, said means being under automatic control of a leaving passenger, means under control of the driver for making the passenger controlled means inoperative, a third means for operating said engine to door open position, said third means being independent of the first two means recited, a fourth independent means for putting said door engine in pneumatic equilibrium whereby all of said previously named means are rendered inoperable, a brake valve and a safety steering wheel operable in conjunction therewith, said wheel when gripped being adapted to prevent operation of said fourth named means.

45. A closure for vehicles comprising a door, a door engine therefor adapted to open and close said door, a treadle adapted to receive the weight of a leaving passenger, a valve cooperating with said treadle and adapted to be held shut by said treadle when said treadle is unloaded and thereby to permit closing of the door, said valve being adapted to open when said treadle is depressed under weight of a passenger, said valve thereby acting to permit the door to open.

46. A closure for vehicles comprising a door, a door engine therefor adapted to open and close said door, a treadle adapted to receive the weight of a leaving passenger, a valve cooperating with said treadle and adapted to be held shut by said treadle when said treadle is unloaded and thereby to permit closing of the door, said valve being adapted to remain open when said treadle is depressed under weight of a passenger, said valve thereby acting to permit the door to open, and a folding step adapted to be operated to open position under door opening action of said engine and adapted to hold said valve open as long as a weight remains either on said treadle or said step.

47. A closure for vehicles comprising a door, a door engine therefor adapted to open and close said door, a treadle adapted to receive the weight of a leaving passenger, a valve cooperating with said treadle and adapted to be held shut by said treadle when said treadle is unloaded and adapted to remain open when said treadle is depressed under weight of a passenger, said valve thereby acting to permit the door to close and to open respectively, and a folding step adapted to be operated to open position by door opening action of said engine and adapted to hold said valve open as long as a weight remains either on said treadle or said step, means operating in conjunction with said treadle and means whereby said first means operates said valve to open position when said treadle is depressed, means whereby opening of said valve sets the engine to door opening position, and means on said step cooperating with an extension on said rod whereby said door remains open and said step remains unfolded when the weight of a passenger is on said step.

48. A steering wheel for passenger vehicles comprising a rim, a member movable with respect thereto, means for operating the brakes of the vehicle from the movable member and means adapted to cause the brakes to be set when the rim and the member are not gripped.

49. In combination, a vehicle, an accelerator therefor adapted to accelerate said vehicle when depressed, a valve operating in conjunction with said accelerator, said valve adapted to open and feed air to a door opening mechanism upon release of said accelerator and adapted to close and exhaust air from said mechanism upon depression of said accelerator.

50. In combination, a vehicle, an accelerator therefor adapted to accelerate said vehicle when depressed, a valve operating in conjunction with said accelerator, said valve adapted to open and feed air to a door opening mechanism upon release of said accelerator and adapted to close and exhaust air from said mechanism upon depression of said accelerator and a differential valve between said valve and said door opening mechanism whereby air ordinarily reaches the door closing side of said mechanism but is cut off and the closing charge exhausted when air from said valve is fed through said differential valve.

51. A safety interlocking control for vehicles comprising a steering wheel switch operable to closed circuit position when the wheel is released, a brake valve operable to non-braking position and thereupon to close a gap in the circuit of said wheel switch, and a magnet valve in said circuit adapted to open when said circuit is closed.

52. A safety interlocking control for vehicles comprising a steering wheel switch operable to closed circuit position when the wheel is released, a brake valve operable to non-braking position and thereupon to close a gap in the circuit of said wheel switch, and a magnet valve in said circuit adapted to open and to kill the engine ignition circuit of said vehicle when said first named circuit is closed.

53. A door-opening system for motor coaches comprising an entrance door and an exit door, means for operating said entrance door under control of a driver, means for operating said exit door under control of said driver, said last-named control depending upon a passenger's movements within said coach regarding said passenger's leaving the coach.

54. A safety interlocking control for vehicles comprising a steering wheel switch operable to closed circuit position when the wheel is released, a brake valve operable to non-braking position and thereby to close a gap in the circuit of said wheel switch, a magnet valve in said circuit adapted to open when said circuit is closed, a relay valve adapted to receive said air from said magnet valve whereby other air is relayed through said relay valve to set the brakes of the vehicle and pneumatically balance the doors thereof.

55. A door-opening system for motor coaches, operable to open the rear door by an operator outside the coach irrespective of passenger's position within, and operable to open the rear door automatically when a passenger leaves the coach, said automatic opening depending upon an action of the coach driver.

56. A safety interlocking control for vehicles comprising a steering wheel switch operable to closed circuit position when the wheel is released, a brake valve operable to non-braking position and thereby to close a gap in the circuit of said wheel switch, a magnet valve in said circuit adapted to pass air therethrough when said circuit is closed, said air being adapted to set the brakes of the vehicle and put the doors thereof in pneumatic equilibrium.

57. A control system for vehicles comprising an air reservoir, main reservoir pressure lines connected therewith, variable pressure lines connected with said reservoir lines, and relayed high pressure lines adapted to receive air from said reservoir lines when said variable pressure lines are above a given low pressure.

58. A control system for vehicles comprising an air reservoir, main reservoir pressure lines connected therewith, variable pressure lines connected with said reservoir lines, and relayed high pressure lines adapted to receive air from said reservoir lines.

59. A control system for vehicles comprising an air reservoir, main reservoir pressure lines connected therewith, variable pressure lines connected with said reservoir lines, and relayed high pressure lines adapted to receive air from said reservoir lines, said relayed lines being adapted to distribute air to various operating devices.

60. A differential control valve comprising a differentially bored cylinder and differential pistons therein, inlet ports for the cylinder, an exhaust port centrally thereof, and outlet ports, said pistons being each adapted to permit passage from an inlet port to an outlet port at one end of their travel and adapted to permit communication between an outlet and the exhaust port at the other end of their travel, said operations taking place alternately for the pistons.

61. An interlocking control system for doors and brakes of vehicles comprising an air reservoir, main reservoir air lines connected therewith, door engines comprising door opening and door closing chambers, said last named chambers being fed by said lines, a brake valve adapted to feed air variably to variable pressure lines connected with the brake operating mechanism of the vehicle, relayed high pressure operating lines adapted by means of a relay valve in the reservoir lines to make the door opening chambers of said door engines operable to effect door opening when the pressure in said variable pressure lines is at or above a predetermined value, and means in conjunction with said brake valve whereby, when an emergency occurs, another relay valve in connection with said reservoir lines is caused to transmit high pressure air to the door opening side of said engines to put them into manual balance.

62. A door operating combination for vehicles comprising a reservoir, a door engine for opening doors, held to door-closing position by high pressure air from said reservoir, and means for exhausting said high pressure air and feeding other air of equal or lower pressure to said engine to put it into door opening position.

63. A safety steering wheel comprising a rim, a rim cooperating with said rim, and located therebeneath, a member to which said movable rim is fastened and a switch cooperating with said member, said switch being adapted to be held in open position when said rims are held together, and to close when said rims are not held together.

In testimony whereof, I have signed my name to this specification this 13th day of May, 1925.

RUFUS W. BAILEY.